US012354579B2

(12) United States Patent
James et al.

(10) Patent No.: US 12,354,579 B2
(45) Date of Patent: Jul. 8, 2025

(54) SYSTEMS AND METHODS FOR ACOUSTIC SIMULATION

(71) Applicant: The Board of Trustees of the Leland Stanford Junior University, Stanford, CA (US)

(72) Inventors: Doug Leonard James, Stanford, CA (US); Jui-Hsien Wang, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 751 days.

(21) Appl. No.: 17/595,935

(22) PCT Filed: May 29, 2020

(86) PCT No.: PCT/US2020/035247
§ 371 (c)(1),
(2) Date: Nov. 29, 2021

(87) PCT Pub. No.: WO2020/243517
PCT Pub. Date: Dec. 3, 2020

(65) Prior Publication Data

US 2022/0319483 A1 Oct. 6, 2022

Related U.S. Application Data

(60) Provisional application No. 62/854,037, filed on May 29, 2019.

(51) Int. Cl.
*G03H 3/00* (2006.01)
*G10H 1/38* (2006.01)

(52) U.S. Cl.
CPC ......... *G10H 1/38* (2013.01); *G10H 2210/301* (2013.01); *G10H 2220/455* (2013.01)

(58) Field of Classification Search
CPC ............... G10H 1/38; G10H 2210/301; G10H 2220/455
See application file for complete search history.

(56) References Cited

U.S. PATENT DOCUMENTS

| | | | |
|---|---|---|---|
| 6,448,488 | B1 | 9/2002 | Ekhaus et al. |
| 2003/0189545 | A1 | 10/2003 | Trajkovic et al. |

(Continued)

FOREIGN PATENT DOCUMENTS

| | | | |
|---|---|---|---|
| WO | 2020243517 | A1 | 12/2020 |

OTHER PUBLICATIONS

International Preliminary Report on Patentability for International Application PCT/US2020/035247, Report issued Nov. 16, 2021, Mailed Dec. 9, 2021, 8 pgs.

(Continued)

*Primary Examiner* — Mohamed Charioui
*Assistant Examiner* — Christine Y Liao
(74) *Attorney, Agent, or Firm* — KPPB LLP

(57) ABSTRACT

Systems and methods for acoustic simulation in accordance with embodiments of the invention are illustrated. One embodiment includes a method for simulating acoustic responses, including obtaining a digital model of an object, calculating a plurality of vibrational modes of the object, conflating the plurality of vibrational modes into a plurality of chords, where each chord includes a subset of the plurality of vibrational modes, calculating, for each chord, a chord sound field in the time domain, where the chord sound field describes acoustic pressure surrounding the object when the object oscillates in accordance with the subset of the plurality of vibrational modes, deconflating each chord sound field into a plurality of modal sound fields, where each modal sound field describes acoustic pressure surrounding the object when the object oscillates in accordance with a (Continued)

single vibrational mode, and storing each modal sound field in a far-field acoustic transfer (FFAT) map.

18 Claims, 14 Drawing Sheets

(56) References Cited

U.S. PATENT DOCUMENTS

| | | | |
|---|---|---|---|
| 2011/0164466 A1 | 7/2011 | Hald | |
| 2015/0120303 A1 | 4/2015 | Shinohara | |
| 2015/0356781 A1 | 12/2015 | Miller | |
| 2018/0233120 A1 | 8/2018 | Pluta | |
| 2020/0296533 A1 * | 9/2020 | Thall | H04S 7/305 |

OTHER PUBLICATIONS

International Search Report and Written Opinion for International Application No. PCT/US2020/035247, Search completed Jul. 31, 2020, Mailed Aug. 19, 2020, 14 pgs.

"All-interval twelve-tone row", Wikipedia, retrieved through link "https://en.wikipedia.org/wiki/All-interval_twelve-tone_row" on Apr. 5, 2024, 4 pgs.

Akenine-Moller et al., "Fast 3D Triangle-Box Overlap Testing", Journal of Graphics Tools, vol. 6, No. 1, 2001, pp. 29-33, doi:10.1080/10867651.2001.10487535.

Allen et al., "Aerophones in Flatland: Interactive Wave Simulation of Wind Instruments", ACM Transactions on Graphics, vol. 34, No. 4, Article 134, Aug. 2015, pp. 1-11, doi:10.1145/2767001.

Bebendorf et al., "Fast parallel solution of boundary integral equations and related problems", Computing and Visualization in Science, vol. 8, No. 3-4, 2005, pp. 121-135.

Bebendorf, M., "Approximation of boundary element matrices", Numerical Mathematics, vol. 86, No. 4, Oct. 1, 2000, pp. 565-589, doi:10.1007/PL00005410.

Bilbao et al., "Physical Modeling of Timpani Drums in 3D on GPGPUs", Journal of the Audio Engineering Society, vol. 61, No. 10, Oct. 2013, pp. 737-748.

Bilbao S., "Modeling of Complex Geometries and Boundary Conditions in Finite Difference/Finite Volume Time Domain Room Acoustics Simulation", IEEE Transactions on Audio, Speech, and Language Processing, vol. 21, No. 7, Jul. 2013, pp. 1524-1533, doi:10.1109/TASL.2013.2256897.

Bilbao S., "Time domain simulation and sound synthesis for the snare drum", Journal of the Acoustical Society of America, vol. 131, No. 1, Jan. 2012, pp. 914-925, doi:10.1121/1.3651240.

Bonneel et al., "Fast Modal Sounds with Scalable Frequency-Domain Synthesis", ACM Transactions on Graphics, vol. 27, No. 3, Aug. 2008, pp. 1-9, doi: 10.1145/1360612.1360623.

Brunner et al., "Comparison of the Fast Multipole Method with Hierarchical Matrices for the Helmholtz-BEM", Computer Modeling in Engineering & Sciences, vol. 58, No. 2, 2010, pp. 131-158, doi: 10.3970/CMES.2010.058.131.

Chadwick et al., "Faster Acceleration Noise for Multibody Animations using Precomputed Soundbanks", SCA '12: Proceedings of the ACM SIGGRAPH/Eurographics Symposium on Computer Animation, Jul. 2012, pp. 265-273, doi: 10.5555/2422356.2422394.

Chadwick et al., "Harmonic Shells: A Practical Nonlinear Sound Model for Near-Rigid Thin Shells", ACM Transactions on Graphics, vol. 28, No. 5, Article 119, Dec. 2009, pp. 1-10, doi: 10.1145/1618452.1618465.

Chadwick et al., "Harmonic Shells: A Practical Nonlinear Sound Model for Near-Rigid Thin Shells", Cornell University; Oct. 15, 2009 [retrieved Jul. 30, 2020). Retrieved from Internet; <URL: https://research.cs.comell.edu/HarmonicShells/HarmonicShells09.pdf>; see entire document.

Chadwick et al., "Precomputed Acceleration Noise for Improved Rigid-Body Sound", ACM Transactions on Graphics, vol. 31, No. 4, 2012, pp. 1-9, doi:10.1145/2185520.2185599.

Cheng et al., "A wideband fast multipole method for the Helmholtz equation in three dimensions", Journal of Computational Physics, vol. 216, 2006, pp. 300-325, doi: 10.1016/j.jcp.2005.12.001.

Cook, P. R., "Sound Production and Modeling", IEEE Computer Graphics & Applications, vol. 22, No. 4, Jul./Aug. 2002, pp. 23-27, doi:10.1109/mcg.2002.1016695.

Doel et al., "Foleyautomatic: Physically-based Sound Effects for Interactive Simulation and Animation", Proceedings of the 28th Annual Conference on Computer Graphics and Interactive Techniques (ACM Transactions on Graphics (Proceedings of SIGGRAPH 2001), 2001, pp. 537-544, doi: 10.1145/383259.383322.

Doel et al., "Synthesis of Shape Dependent Sounds with Physical Modeling", International Conference on Auditory Display, vol. 28, 1996, 4 pgs.

Gaver, William W., "Synthesizing auditory icons", Proceedings of the Interact'93 and CHI'93 conference on Human factors in computing systems, ACM, Apr. 24-29, 1993, pp. 228-235, doi: 10.1145/169059.169184.

Golub et al., "Matrix computations", The Johns Hopkins University Press, 4th Edition, 2013, 780 pgs.

James et al., "Physically Based Sound for Computer Animation and Virtual Environments", ACM SIGGRAPH 2016 Courses, 2016, 8 pgs., doi:10.1145/2897826.2927375.

James et al., "Precomputed Acoustic Transfer: Output-sensitive, accurate sound generation for geometrically complex vibration sources", ACM Transactions on Graphics, vol. 25, No. 3, Aug. 2006, pp. 987-995, doii:10.1145/1141911.1141983.

Jung et al., "Solving Time Domain Helmholtz Wave Equation with MOD-FDM", Progress in Electromagnetics Research, PIER 79, 2008, pp. 339-352, [retrieved Jul. 30, 2020). Retrieved from Internet; <URL: http://www.jpier.org/PIER/pier79/22.07102802.pdf>.

Komatitsch et al., "High-order finite-element seismic wave propagation modeling with MPI on a large GPU cluster", Journal of Computational Physics, vol. 229, No. 20, 2010, pp. 7692-7714, 10.1016/j.jcp.2010.06.024.

Langlois et al., "Eigenmode Compression for Modal Sound Models", ACM Transactions on Graphics, vol. 33, No. 4, Article 40, Jul. 2014, pp. 1-9, doi:10.1145/2601097.2601177.

Langlois et al., "Toward Animating Water with Complex Acoustic Bubbles", ACM Transactions on Graphics, vol. 35, No. 4, Article 95, Jul. 2016, pp. 1-13, doi: 10.1145/2897824.2925904.

Li et al., "Interactive Acoustic Transfer Approximation for Modal Sound", ACM Transactions on Graphics, vol. 35, No. 1, Article 2, Dec. 2015, pp. 1-16, doi: http://dx.doi.org/10.1145/2820612.

Liu, et al., "The perfectly matched layer for acoustic waves in absorptive media", The Journal of the Acoustical Society of America, vol. 102, No. 4, Oct. 1997, pp. 2072-2082, doi:10.1121/1.419657.

Looges et al., "Optimal greedy algorithms for indifference graphs", Proceedings IEEE Southeastcon 1992, 1992, vol. 1, pp. 144-149, doi:10.1109/secon.1992.202324.

Mehra et al., "An Efficient GPU-based Time Domain Solver for the Acoustic Wave Equation", Preprint submitted to Applied Acoustics, Jun. 22, 2011, 13 pgs.

Mehra et al., "An efficient GPU-based time domain solver for the acoustic wave equation", Applied Acoustics, vol. 73, No. 2, Feb. 2012, pp. 83-94, doi:10.1016/j.apacoust.2011.05.012.

Meshram et al., "P-HRTF: Efficient Personalized HRTF Computation for High-Fidelity Spatial Sound", Mixed and Augmented Reality (ISMAR), IEEE International Symposium on (2014), Sep. 10-12, 2014, pp. 53-61, doi:10.1109/ISMAR.2014.6948409.

Micikevicius P., "3D Finite Difference Computation on GPUs using CUDA", Proceedings of 2nd Workshop on General Purpose Processing on Graphics Processing Units (GPGPU-2), 2009, pp. 79-84, doi: 10.1145/1513895.1513905.

Morales et al., "A Parallel Time-Domain Wave Simulator Based on Rectangular Decomposition for Distributed Memory Architectures", Preprint submitted to Elsevier, Jul. 2, 2015, 10 pgs.

Morrison et al., "Mosaic: A Framework for Modal Synthesis", Computer Music Journal, vol. 17, No. 1, 1993, pp. 45-56, doi:10.2307/3680569.

O'Brien et al., "Synthesizing Sounds from Rigid-Body Simulations", ACM SIGGRAPH symposium on Computer animation, 2002, 175-181, doi:10.1145/545261.545290.

(56) References Cited

OTHER PUBLICATIONS

Pai et al., "Scanning Physical Interaction Behavior of 3D Objects", Proceedings of the 28th Annual Conference on Computer Graphics and Interactive Techniques—SIGGRAPH '01, 2001, pp. 87-96, doi:10.1145/383259.383268.
Prepelita et al., "Influence of Voxelization on Finite Difference Time Domain Simulations of Head-Related Transfer Functions", The Journal of the Acoustical Society of America, vol. 139, No. 5, 2016, pp. 2489-2504, doi:10.1121/1.4947546.
Ren et al., "Example-Guided Physically Based Modal Sound Synthesis", ACM Transactions on Graphics (TOG), vol. 32, No. 1, Article 1, Jan. 2013, pp. 1-16, doi 10.1145/2421636.2421637.
Saad et al., "GMRES: A Generalized Minimal Residual Algorithm for Solving Nonsymmetric Linear Systems", SIAM Journal on Scientific Computing, vol. 7, No. 3, Jul. 1986, pp. 856-869, doi: 10.1137/0907058.
Serra et al., "Spectral Modeling Synthesis: A Sound Analysis/Synthesis System Based on a Deterministic plus Stochastic Decomposition", Computer Music Journal, vol. 14, No. 4,1990, pp. 12-24, doi: 10.2307/3680788.
Smigaj et al., "Solving Boundary Integral Problems with BEM++", ACM Transactions on Mathematical Software, vol. 41, No. 2, Article 6, Jan. 2015, pp. 1-40, doi: 10.1145/2590830.
Takala et al., "Sound rendering", ACM Transactions on Graphics (Proceedings of SIGGRAPH 1992), 1992, pp. 211-220, doi: 10.1145/133994.134063.
Wang et al., "Toward Wave-based Sound Synthesis for Computer Animation", ACM Transactions on Graphics (TOG), vol. 37, No. 4, Article 109, Jul. 2018, pp. 1-16, doi: 10. 1145/3197517.3201318.
Zheng et al., "Harmonic Fluids", ACM Transactions on Graphics, vol. 28, No. 3, Article 37, Aug. 2009, pp. 1-12, doi: 10.1145/1531326.1531343.
Zheng et al., "Rigid-Body Fracture Sound with Precomputed Soundbanks", ACM Transactions on Graphics, vol. 29, No. 4, Article 69, Jul. 2010, pp. 1-13, doi: 10.1145/1778765.1778806.
Zheng et al., "Toward High-Quality Modal Contact Sound", ACM Transactions on Graphics (Proceedings of SIGGRAPH 2011), vol. 30, No. 4, Article 38, Jul. 2011, pp. 1-11, doi:10.1145/2010324.1964933.

* cited by examiner

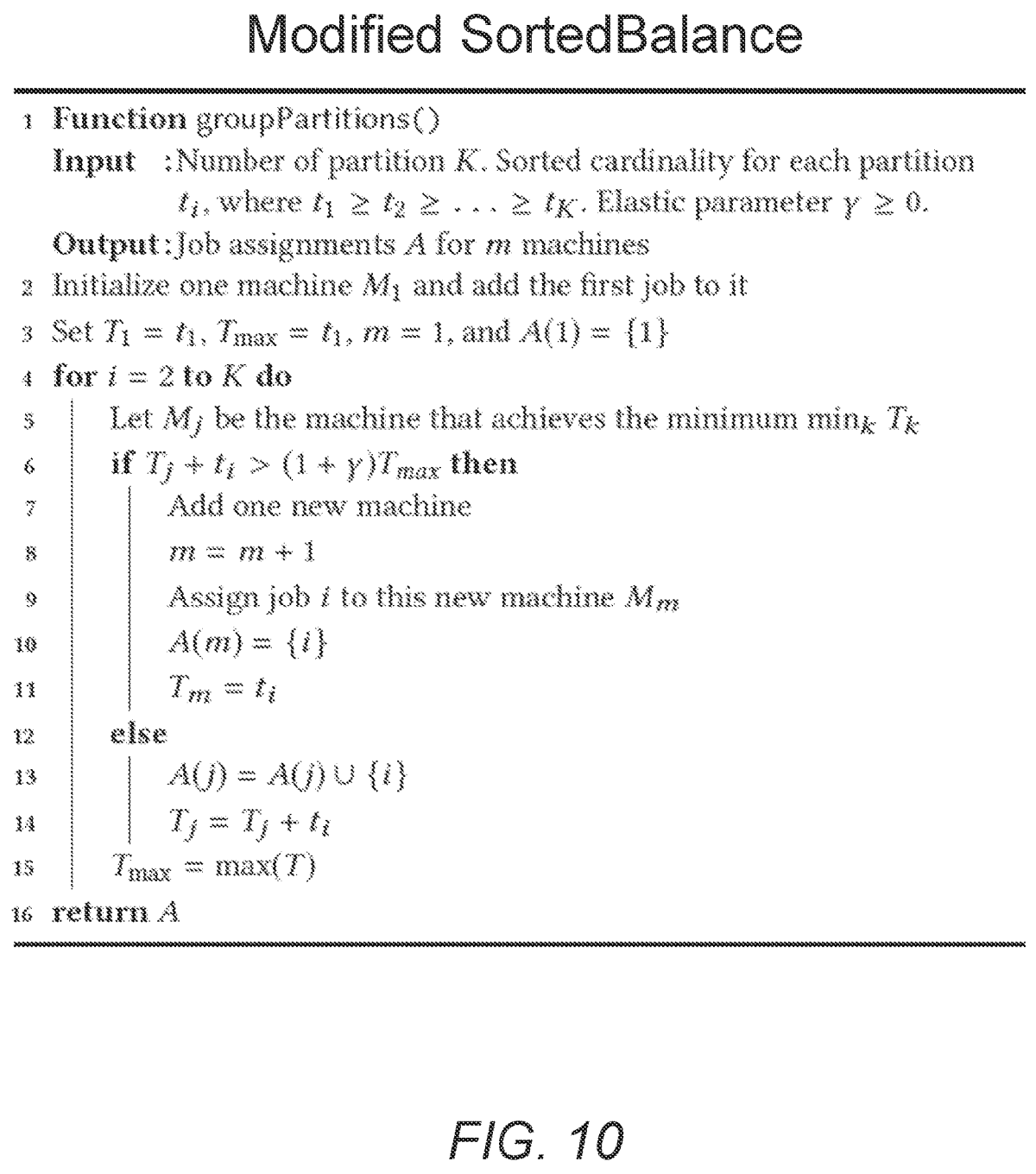

Modified SortedBalance

```
Function groupPartitions()
Input   : Number of partition K. Sorted cardinality for each partition
          t_i, where t_1 ≥ t_2 ≥ . . . ≥ t_K. Elastic parameter γ ≥ 0.
Output  : Job assignments A for m machines
Initialize one machine M_1 and add the first job to it
Set T_1 = t_1, T_max = t_1, m = 1, and A(1) = {1}
for i = 2 to K do
    Let M_j be the machine that achieves the minimum min_k T_k
    if T_j + t_i > (1 + γ)T_max then
        Add one new machine
        m = m + 1
        Assign job i to this new machine M_m
        A(m) = {i}
        T_m = t_i
    else
        A(j) = A(j) ∪ {i}
        T_j = T_j + t_i
    T_max = max(T)
return A
```

FIG. 10

SYSTEMS AND METHODS FOR ACOUSTIC SIMULATION

CROSS-REFERENCE TO RELATED APPLICATIONS

The current application is a national stage of PCT Application No. PCT/US2020/035247 entitled "Systems and Methods for Acoustic Simulation" filed May 29, 2020, which claims the benefit of and priority under 35 U.S.C. § 119(e) to U.S. Provisional Patent Application No. 62/854,037 entitled "Optimal Mode Conflation for Time-Domain Precomputations of Acoustic Transfer" filed May 29, 2019, the disclosures of which are hereby incorporated by reference in their entireties for all purposes.

FIELD OF THE INVENTION

The present invention generally relates to simulating acoustic responses, and more specifically to time-domain precomputation of acoustic transfer models and their efficient storage for use in runtime acoustic response synthesis.

BACKGROUND

Sound is a vibration which propagates as an acoustic wave through a transmission medium. However, the human sense of sound is experiential. That is, the human nervous system performs significant signal processing on received acoustic waves that are then perceived. The field of psychoacoustics is concerned with sound perception and audiology.

A "vibrational mode" (also "vibration mode," or simply "mode") of an object refers to a particular oscillation pattern. Objects often have many modes which tend to increase in number as the complexity of the object increases. When one "hears" an object in the real world, it is the result of the ear experiencing pressure waves generated by the object oscillating in one or many of its vibrational modes.

SUMMARY OF THE INVENTION

Systems and methods for acoustic simulation in accordance with embodiments of the invention are illustrated. One embodiment includes a method for simulating acoustic responses, including obtaining a digital model of an object, calculating a plurality of vibrational modes of the object, conflating the plurality of vibrational modes into a plurality of chords, where each chord includes a subset of the plurality of vibrational modes, calculating, for each chord, a chord sound field in the time domain, where the chord sound field describes acoustic pressure surrounding the object when the object oscillates in accordance with the subset of the plurality of vibrational modes, deconflating each chord sound field into a plurality of modal sound fields, where each modal sound field describes acoustic pressure surrounding the object when the object oscillates in accordance with a single vibrational mode, and storing each modal sound field in a far-field acoustic transfer (FFAT) map.

In another embodiment, the method further includes rendering the digital model of the object in a digital environment, receiving interaction data, where the interaction data describes an interaction between the rendered digital model and a second object in the digital environment, and playing back an acoustic response based on vibrations of the digital model of the object in response to the described interaction.

In a further embodiment, playing back the acoustic response includes selecting at least one FFAT map based on the vibrations of the digital model, determining a location of a listener in the virtual environment with respect to the digital model, summing amplitudes for each frequency generated by the object at the location of the listener based on the FFAT maps.

In still another embodiment, the second object in the digital environment is an avatar.

In a still further embodiment, the second object in the digital environment is a cursor.

In yet another embodiment, the FFAT map is stored as metadata to the digital object.

In a yet further embodiment, calculating the chord sound field includes solving the Helmholtz wave equation in the time domain.

In another additional embodiment, conflating the plurality of vibrational modes comprises utilizing a greedy algorithm to identify the subset of the plurality of chords separated by a gap parameter.

In a further additional embodiment, the FFAT map approximates a squared transfer amplitude at a plurality of coordinates using a real-valued expansion.

In another embodiment again, an acoustic simulator includes a processor, a graphics processing unit (GPU), and a memory, the memory containing an acoustic modeling application, where the acoustic modeling application directs the processor to obtain a digital model of an object, calculate a plurality of vibrational modes of the object, conflate the plurality of vibrational modes into a plurality of chords, where each chord includes a subset of the plurality of vibrational modes, calculate, for each chord, a chord sound field in the time domain, where the chord sound field describes acoustic pressure surrounding the object when the object oscillates in accordance with the subset of the plurality of vibrational modes using the GPU, deconflate each chord sound field into a plurality of modal sound fields, where each modal sound field describes acoustic pressure surrounding the object when the object oscillates in accordance with a single vibrational mode, and store each modal sound field in a far-field acoustic transfer (FFAT) map.

In a further embodiment again, the acoustic modeling application further directs the processor to render the digital model of the object in a digital environment, receive interaction data, where the interaction data describes an interaction between the rendered digital model and a second object in the digital environment, and play back an acoustic response based on vibrations of the digital model of the object in response to the described interaction.

In still yet another embodiment, to play back the acoustic response, the acoustic modeling application further directs the processor to select at least one FFAT map based on the vibrations of the digital model, determine a location of a listener in the virtual environment with respect to the digital model, sum amplitudes for each frequency generated by the object at the location of the listener based on the FFAT maps.

In a still yet further embodiment, the second object in the digital environment is an avatar.

In still another additional embodiment, the second object in the digital environment is a cursor.

In a still further additional embodiment, the FFAT map is stored as metadata to the digital object.

In still another embodiment again, to calculate the chord sound field, the acoustic modeling application further directs the GPU to solve the Helmholtz wave equation in the time domain.

In a still further embodiment again, to conflate the plurality of vibrational modes, the acoustic modeling application further directs the processor to utilize a greedy algorithm to identify the subset of the plurality of chords separated by a gap parameter.

In yet another additional embodiment, the FFAT map approximates a squared transfer amplitude at a plurality of coordinates using a real-valued expansion.

In a yet further additional embodiment, a method for rendering sound for a digital environment includes obtaining a plurality of far-field acoustic transfer (FFAT) maps, where the plurality of FFAT maps is associated with an object rendered in the digital environment, receiving interaction data describing an interaction with the object, selecting a portion of FFAT maps from the plurality of FFAT maps, where the selected portion of FFAT maps are associated with vibrational modes of the object activated by the interaction, determining an acoustic response signal to the interaction based on the FFAT maps, and playing back the acoustic response signal.

In yet another embodiment again, the plurality of FFAT maps are generated by obtaining a digital model of the object, calculating a plurality of vibrational modes of the object, conflating the plurality of vibrational modes into a plurality of chords, where each chord comprises a subset of the plurality of vibrational modes, calculating, for each chord, a chord sound field in the time domain, where the chord sound field describes acoustic pressure surrounding the object when the object oscillates in accordance with the subset of the plurality of vibrational modes, deconflating each chord sound field into a plurality of modal sound fields, where each modal sound field describes acoustic pressure surrounding the object when the object oscillates in accordance with a single vibrational mode, and storing each modal sound field in a far-field acoustic transfer (FFAT) map.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 10 is a chart illustrating formalized pseudocode for a modified SortedBalance algorithm in accordance with an embodiment of the invention.

DETAILED DESCRIPTION

Figure 1:
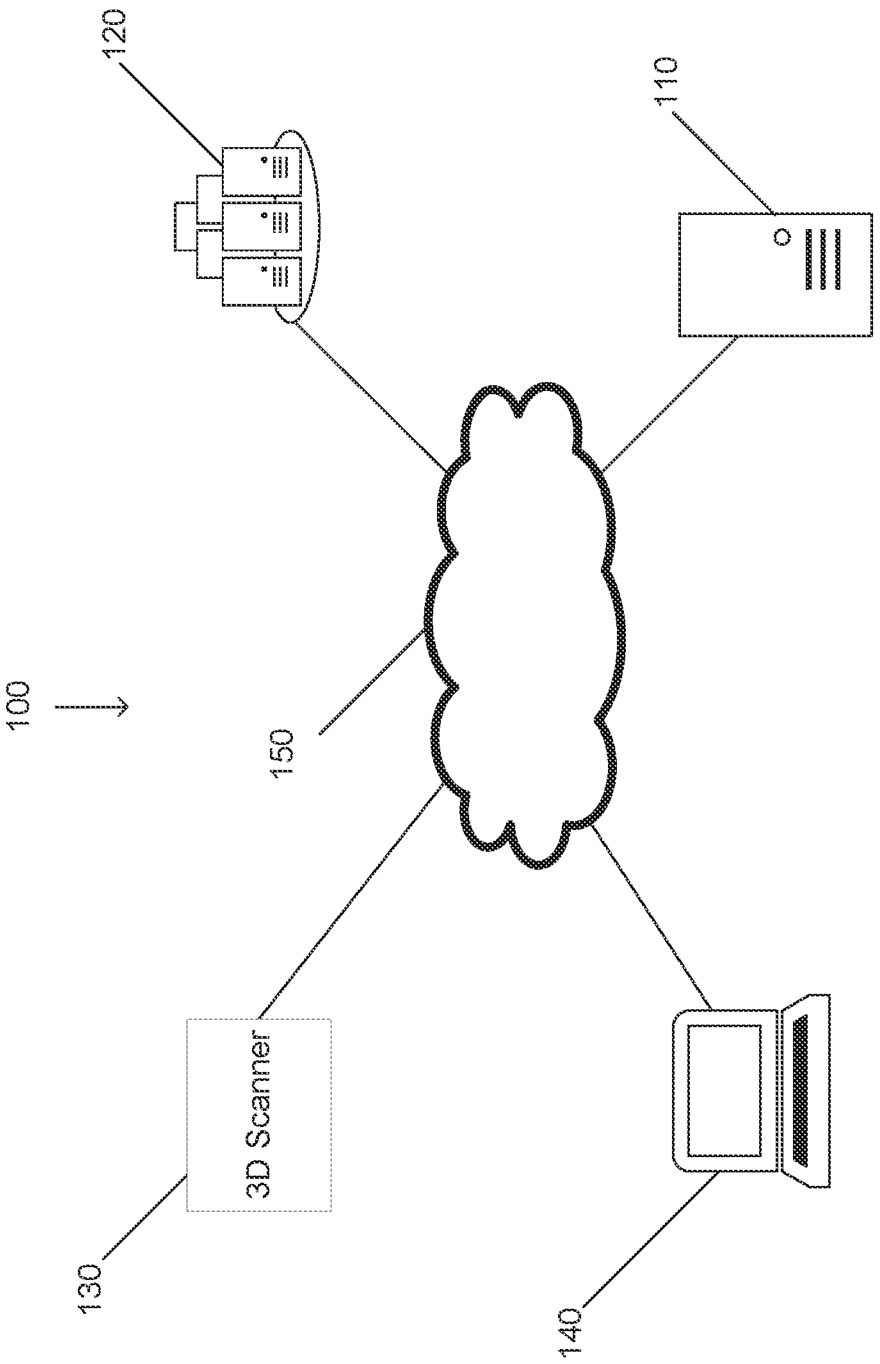
FIG. 1 is a system diagram for an acoustic simulation system in accordance with an embodiment of the invention.

Turning now to the drawings, systems and methods for acoustic stimulation using time-domain wave solvers are described. Making a digital object "sound" correct to a human listener is a difficult problem. In many cases, when the synthetic sounds coming from a digital object do not match a subconscious understanding of what a real-world version of the digital object should sound like, the listener can perceive the difference. With the rise of highly interactive digital technology such as (but not limited to) virtual reality (VR), augmented reality (AR), mixed reality (MR), and even more conventional computer interfaces such as 2D monitors, accurate acoustic representations of digital objects are becoming more critical and desirable. Indeed, immersion in a graphically perfect visualization can easily be broken by unnatural acoustics. For example, in a VR game where the user can pick up and manipulate objects in their hands, if the user strikes a wine glass at the stem and subsequently the upper rim, they will expect significantly different resulting sounds.

Current acoustic modeling techniques can yield a relatively accurate model which can be used to recreate a "sound field," a representation of acoustic waves present in a given environment, which in turn can be used to synthesize audio for many of the above technologies. However, these current methods are extremely computationally intensive. Traditionally, modal sound models use linear vibration modes to effectively characterize the surface vibrations of struck objects. The sound amplitude of each vibrational mode is described by its acoustic transfer function, whose spatial structure accounts for perceptually important wave effects such as (but not limited to) diffraction and radiation efficiency.

Conventional methodologies precompute the acoustic transfer functions by solving the frequency-domain wave equation (Helmholtz equation) once for each vibrational mode. Even for simple objects, there can be hundreds of audible modes, meaning the Helmholtz equation must be solved hundreds of times. Conventional Helmholtz boundary element method (BEM) solvers take on the order from hours to days of transfer precomputation on large computing clusters for objects of even moderate size. Current digital environments have hundreds if not thousands of different types of objects, which number is anticipated to increase as technical limitations are overcome. Consequently, conventional methods are impractical and, in many cases, infeasible as solving the Helmholtz equation for each vibrational mode for each object may take weeks, months, or even years.

Systems and methods described herein greatly reduce the computational power needed to accurately model the vibrational modes of an object. In many embodiments, the vibrational modes can be conflated into a set of "chords" via a process referred to as "mode conflation." The sound field for each chord ("chord sound field") can be calculated in groups (as opposed to the conventional frequency domain for reasons described in further detail below) in such a way that the sound field can be accurately decomposed back into separate sound fields for each constituent mode ("modal sound fields") through a process of "transfer deconflation." In numerous embodiments, transfer deconflation is achieved using a structure-exploiting QR solver. To further increase throughput, systems and methods described herein can leverage a graphics processing unit (GPU) vector wave-solver that attempts fine-grain load balancing by interleaving the different solves. Systems and methods described herein can simulate orders of magnitude faster (on the order of seconds and minutes), and are expected to be further sped up as computing technology matures further. To enable fast runtime transfer representation, a Far-field Acoustic Transfer (FFAT) map can be used that approximates transfer amplitudes at accuracy suitable for sound rendering. Architectures for acoustic simulation systems are described in further detail below.

Acoustic Simulation Systems

Acoustic simulation systems as described herein utilize time-domain wave solving techniques to rapidly solve the acoustic modes of an object. In many embodiments, the object is a real-world object that has been digitized using a scanning process. However, in many embodiments, the object can be any arbitrary digitally modeled object. Acoustic simulation systems can further pack solved modes into FFAT maps for use in real-time rendering, and/or any other acoustic model storage format as appropriate to the requirements of specific applications of embodiments of the invention. Objects can be stored along with their associated FFAT maps in a repository.

Turning now to FIG. 1, an acoustic simulation system in accordance with an embodiment of the invention is illustrated. System 100 includes an acoustic simulator 110. The acoustic simulator is a computing platform capable of carrying out the acoustic simulation processes described herein. In numerous embodiments, the acoustic simulator controls distributed processing across a number of different acoustic simulators (not pictured). The system 100 further includes multiple object repositories. In many embodiments, the object repositories store digital objects. The acoustic simulator can obtain digital objects from the object repositories and generate an acoustic model. In numerous embodiments, the acoustic models can be stored as metadata to the digital object. However, acoustic simulators do not necessarily need to obtain digital objects from a repository, and instead can obtain them via input from any of a number of other sources including (but not limited to) object modeling on the acoustic simulator, direct input via a storage media, directly from a 3D scanner, via a network and/or via any other input method as appropriate to the requirements of specific applications of embodiments of the invention. One or more object repositories can be used, but are not required for the function of acoustic simulators or acoustic simulator systems.

System 100 further includes a 3D scanner 130. While 3D scanners are not a requirement of acoustic simulation systems, they can be used to directly obtain an accurate digital object version of a real-world object. The system 100 can further include an interface device 140 which enables user interaction with the system. In many embodiments, the interface device 140 is an interactive display such as, but not limited to, a smart phone, a personal computer, a tablet computer, a smart TV, and/or any other interactive display as appropriate to the requirements of specific applications of embodiments of the invention.

Components in system 100 are connected via a network 150. Networks can be composed of wired networks, wireless networks, or a mixture of wired and wireless networks. In many embodiments, the network is the Internet. As can be readily appreciated, any number of different networking solutions can be used as appropriate to the requirements of specific applications of embodiments of the invention. While a particular architecture in accordance with an embodiment of the invention is illustrated in FIG. 1, one can appreciate that any number of different architectures, including those that have additional or fewer components can be used without departing from the scope or spirit of the invention. Acoustic simulators are discussed in further detail below.

Acoustic Simulators

Figure 2:
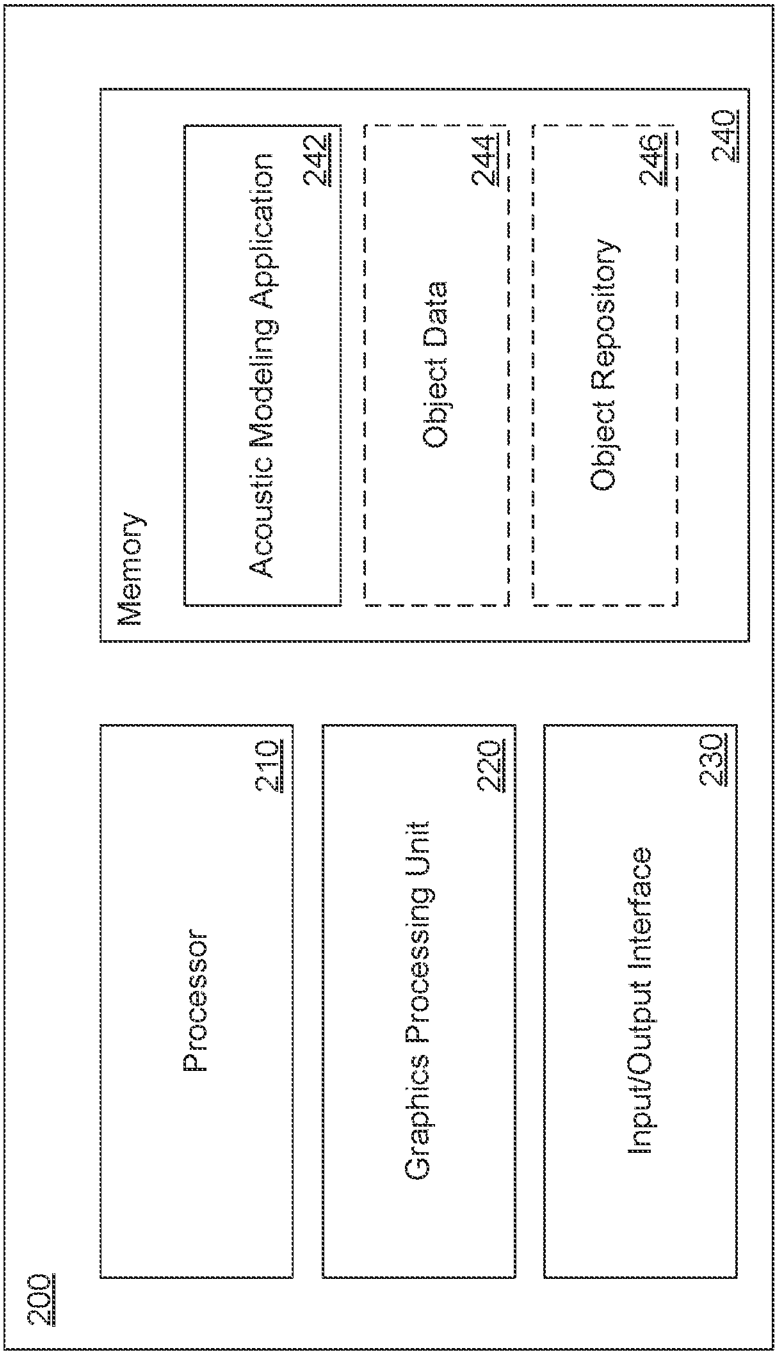
FIG. 2 is a block diagram for an acoustic simulator in accordance with an embodiment of the invention.

Acoustic simulators are computing devices capable of calculating vibrational modes of 3D objects. In numerous embodiments, acoustic simulators are implemented using a personal computer. However, in numerous embodiments, acoustic simulators are implemented in computing clusters and/or on server systems. Turning now to FIG. 2, an example acoustic simulator in accordance with an embodiment of the invention is illustrated.

Acoustic simulator 200 includes a processor 210. The processor 210 can be any type of logic processing unit such as, but not limited to, a central processing unit (CPU), an application-specific integrated circuit (ASIC), a field-programmable gate-array (FPGA), and/or any other circuit as appropriate to the requirements of specific applications of embodiments of the invention. In many embodiments, acoustic simulators have one or more processors. Acoustic simulator 200 further includes a graphics processing unit (GPU) 220. GPUs are specialized logic processing circuitry built for performing graphics calculations, and have architectures which enable parallelized processing. Acoustic simulators can utilize one or more GPUs in order to accelerate processing, but they are not required. In various embodiments, all processing takes place on the processor.

The acoustic simulator further includes an input/output (I/O) interface 230. The I/O interface can enable communications between the acoustic simulator and other computing devices or input devices (e.g. keyboards, computer mice, touch screens, controllers, etc.). I/O interfaces can communicate with more than one device at a time, and can enable network communications. The acoustic simulator contains a memory 240. The memory 240 can be implemented using volatile memory, nonvolatile memory, or a combination thereof. The memory contains an acoustic simulation application 242. Acoustic simulation applications contain instructions which direct the processing circuitry (including GPUs in many embodiments when available) to perform various acoustic simulation processes. In numerous embodiments, the memory further contains object data 244 and an object repository 246. Object data is any data describing a digital object such as (but not limited to), parameters describing the physical structure of the object, composition data describing what materials the object is made out of, vibrational modes of the object, object labels, and/or any other information about the digital object as appropriate to the requirements of specific applications of embodiments of the invention. In numerous embodiments, parameters describing the physical structure of the object include 3D vertex coordinates describing the surface of the 3D object. However, as can readily be appreciated, any number of different structures can be used to describe a physical object such as (but not limited to) point clouds, vertex information that includes description of interior cavity surfaces, and/or any other representation capable of describing an object's form. Object repositories do not need to be only stored on acoustic simulators, and may be stored elsewhere. In many embodiments, object repositories contain a list of objects and any associated acoustic models (e.g., FFAT maps).

While a particular acoustic simulator in accordance with an embodiment of the invention is illustrated in FIG. 2, one can appreciate that any number of different architectures, including those that have additional or fewer components, and/or additional or fewer data structures stored in memory can be used without departing from the scope or spirit of the invention. Acoustic modeling processes in the time-domain are described in further detail below Acoustic Modeling Processes At a high level, acoustic modeling processes determine the modal sound field for all relevant vibrational modes of an object and store them such that they can be easily played back either alone or in combination in real time to simulate the acoustic response of the object. In this way, the simulated digital object will have a "natural" sounding acoustic response to manipulation in a virtual environment. As noted above, a severe bottleneck in conventional acoustic modeling processes is solving for every vibrational mode. Traditionally, each vibrational mode is "solved" in the frequency domain one at a time. In this context "solving" (or "wave solving") a mode (or chord) refers to calculating the sound field for the given mode (or chord). A "solver" (or "wave-solver") is a mathematical process that does the work of said calculation, often involving the Helmholtz equation. As noted above, conflation of multiple modes for simultaneous processing enables significant computational efficiency gains over conventional precomputed acoustic transfer (PAT) methodologies. A challenge with conflating multiple modes is later deconflating the resulting chord sound field into individual solutions for the original component modes. Acoustic modeling processes described herein can solve multiple vibrational modes at the same time in the time-domain in such a way that the combined solution can be easily broken down into solutions for each individual constituent vibrational mode. Further, acoustic modeling processes improve on FFAT map storage to enable more efficient real-time playback.

Figure 3:
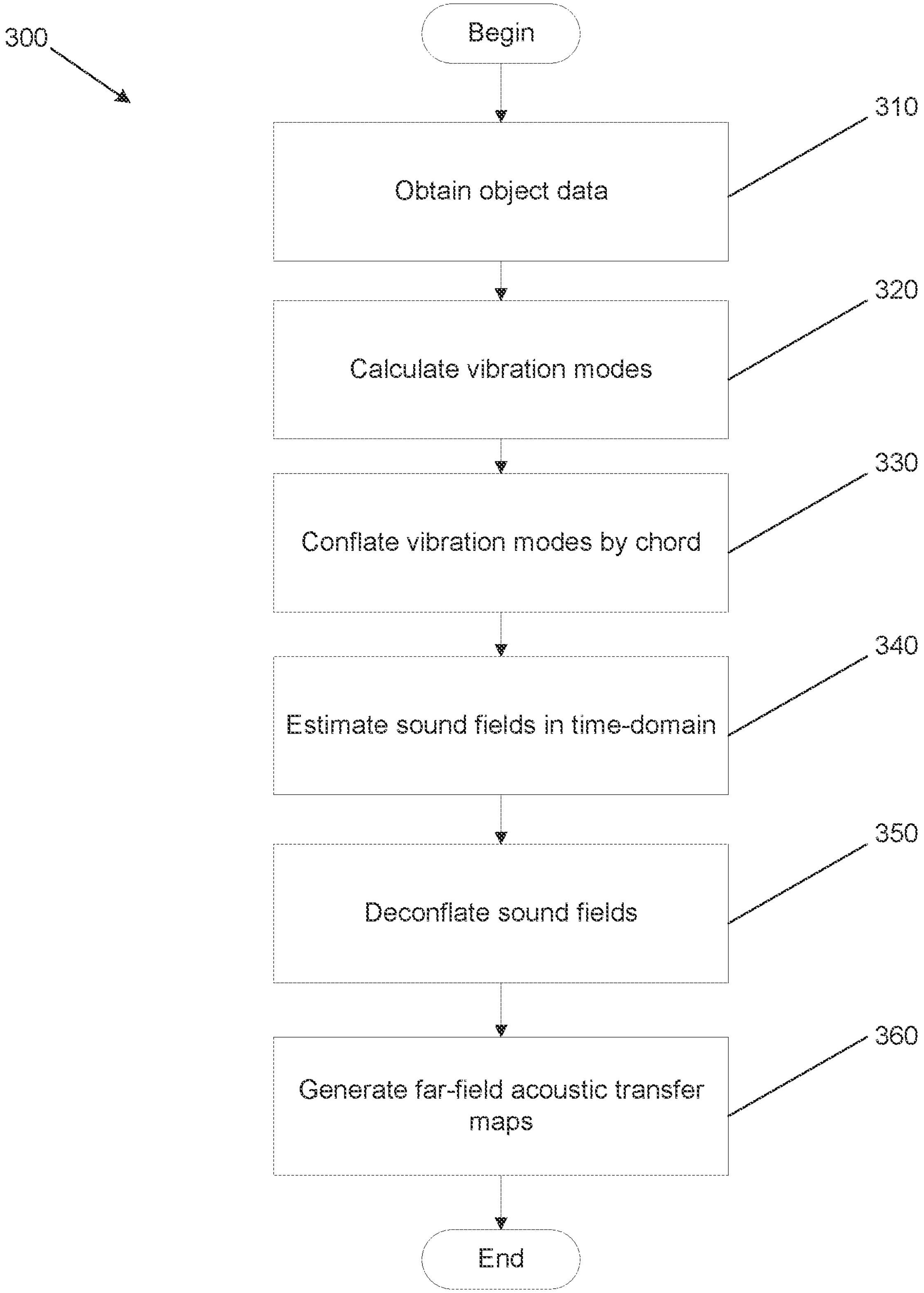
FIG. 3 is a flow chart for a pipeline for time-domain precomputed acoustic transfer process in accordance with an embodiment of the invention.

Systems and methods described herein conflate modes in a particular manner and subsequently process them in the time domain (rather than the frequency domain) in such a manner that easily enables accurate deconflation. Turning now to FIG. 3, a high-level flowchart describing a pipeline for time-domain PAT in accordance with an embodiment of the invention is illustrated.

Figure 4:
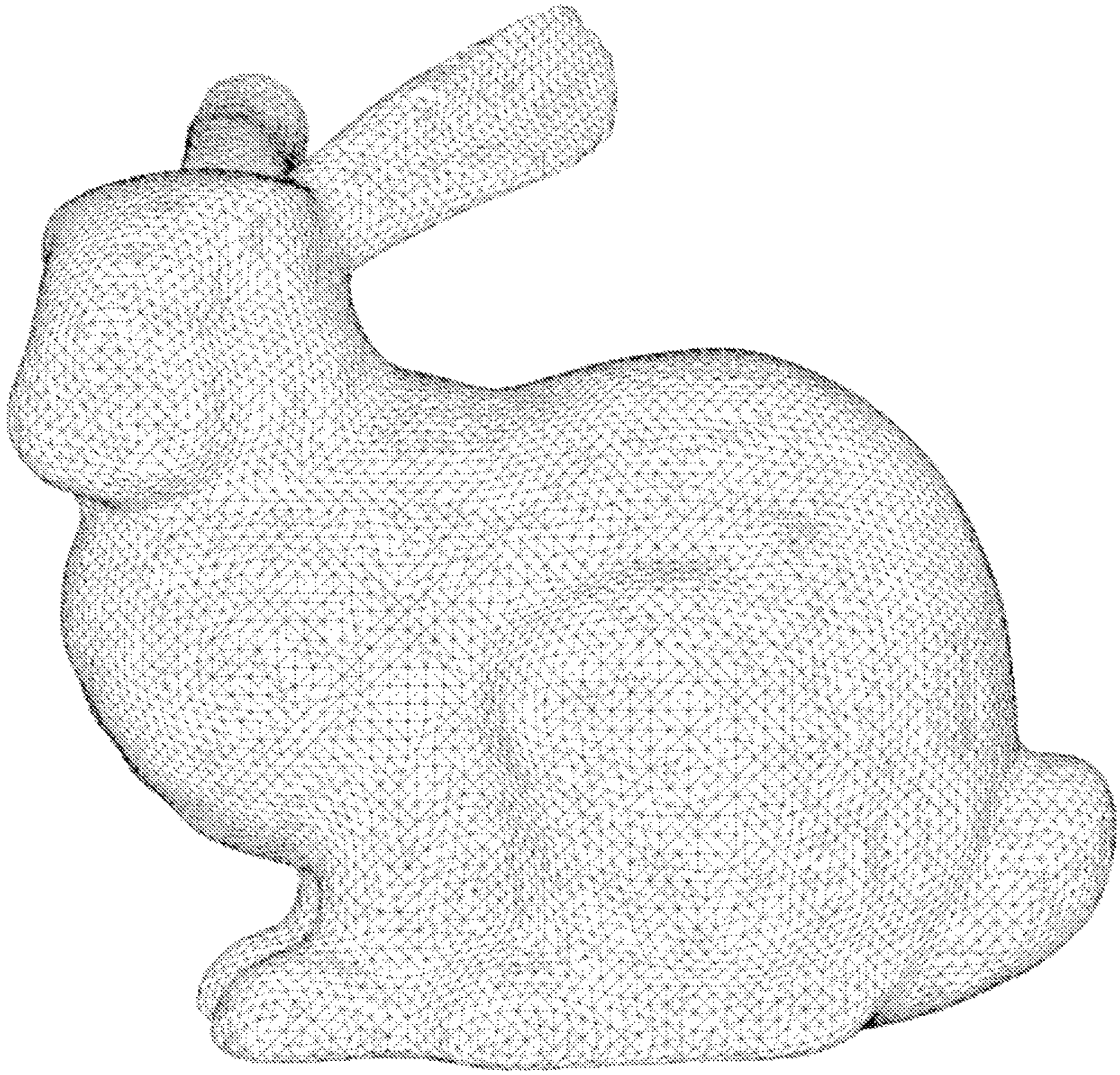
FIG. 4 illustrates an example object represented by a tetrahedral mesh in accordance with an embodiment of the invention.

Process 300 includes obtaining (310) an object data. In many embodiments, object data is obtained from an object repository. In various embodiments, object data is obtained at least in part via a 3D scan of an object. Vibration modes are calculated (320) for the object described by the object data. In numerous embodiments, object data that already describes the object's vibrational modes, in which case they do not need to be calculated again. In numerous embodiments, vibration modes are calculated by generating a tetrahedral mesh of the object, however any number of different methodologies can be used to calculate the vibrational modes of an object. An example object represented by a tetrahedral mesh in accordance with an embodiment of the invention is illustrated in FIG. 4.

Figure 5:
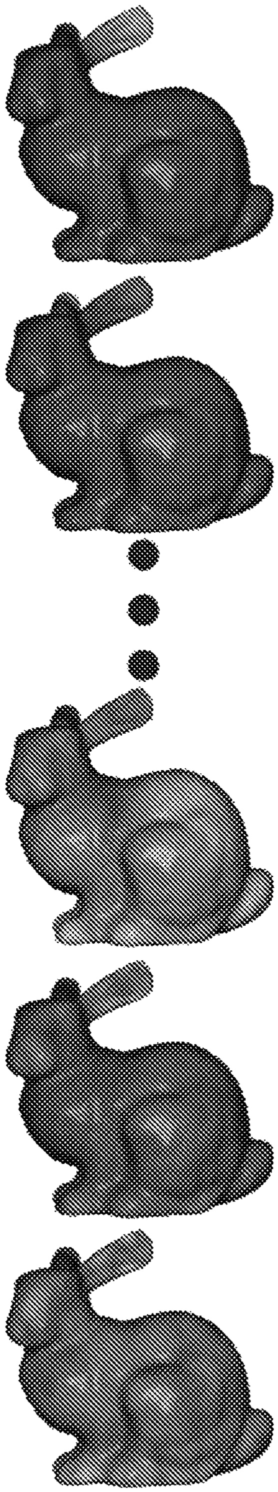
FIG. 5 illustrates a number of vibrational modes of an object in accordance with an embodiment of the invention.

As an example, in many embodiments, calculation of the vibrational modes of an object using a tetrahedral mesh involves, for each tetrahedron in the mesh, calculating a mass. Each vertex in the mesh can be assigned ¼ of the mass of each of its surrounding tetrahedron, such that each vertex has a mass. Stiffness can further be calculated for each vertex using a set of virtual springs. The mass and stiffness values can be used to calculate the vibration modes of the object using conventional means (e.g. solving a standard eigenvalue problem). In numerous embodiments, all vibration modes are calculated. In some embodiments, vibrational modes that are redundant (e.g. due to symmetry) are either not calculated or discarded. Example vibrational modes of the object illustrated in FIG. 4 in accordance with an embodiment of the invention are illustrated in FIG. 5. As can be readily appreciated, as noted above, using tetrahedral meshes is an example of but one of many ways to calculate the vibrational modes of an object, any number of methods to generate vibrational modes can be used, including (but not limited to) analytical, numerical/computational, and/or experimental methods as appropriate to the requirements of specific applications of embodiments of the invention.

Figure 6:
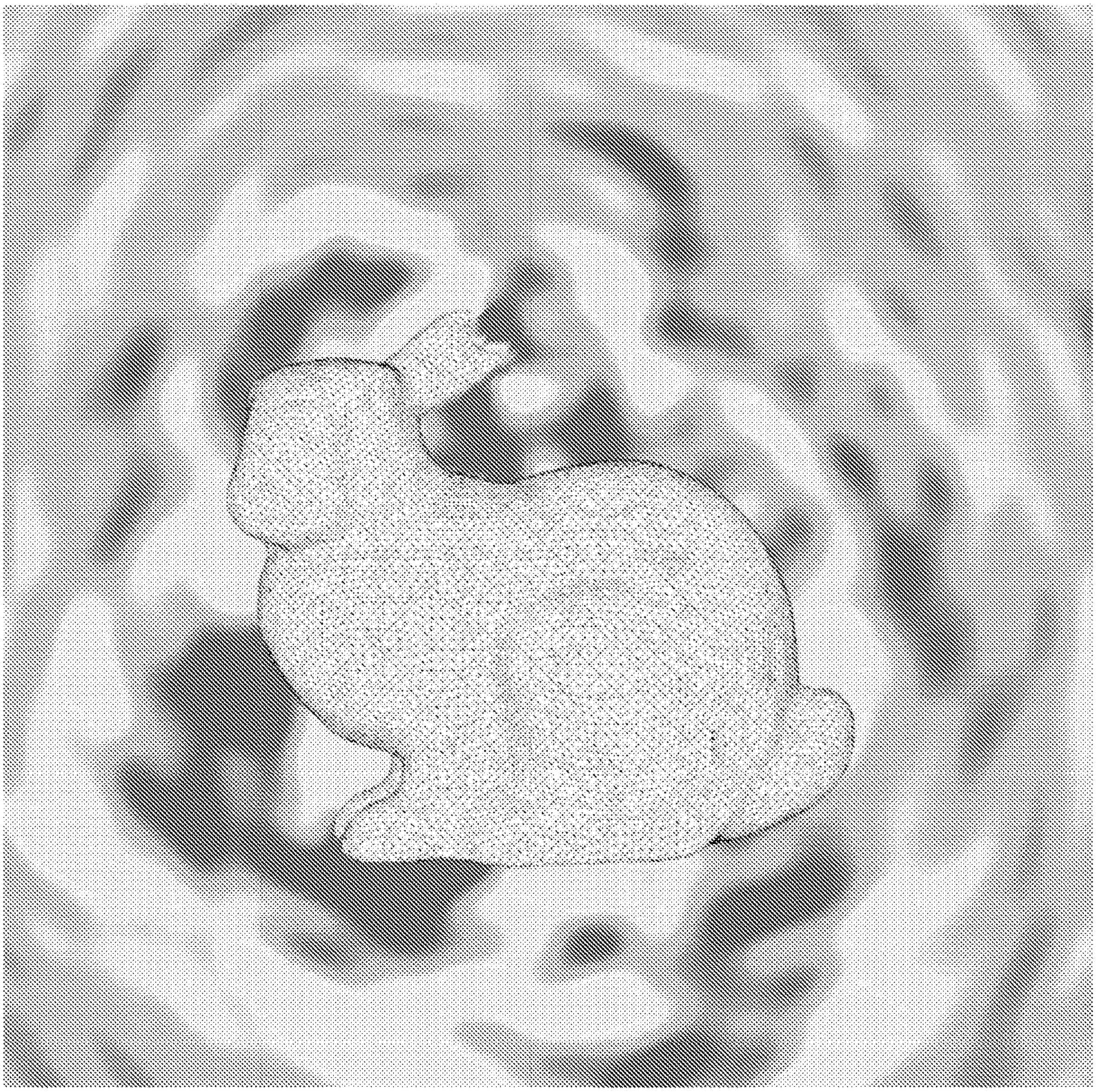
FIG. 6 illustrates a chord sound field for an arbitrary chord in accordance with an embodiment of the invention.
Figure 7:
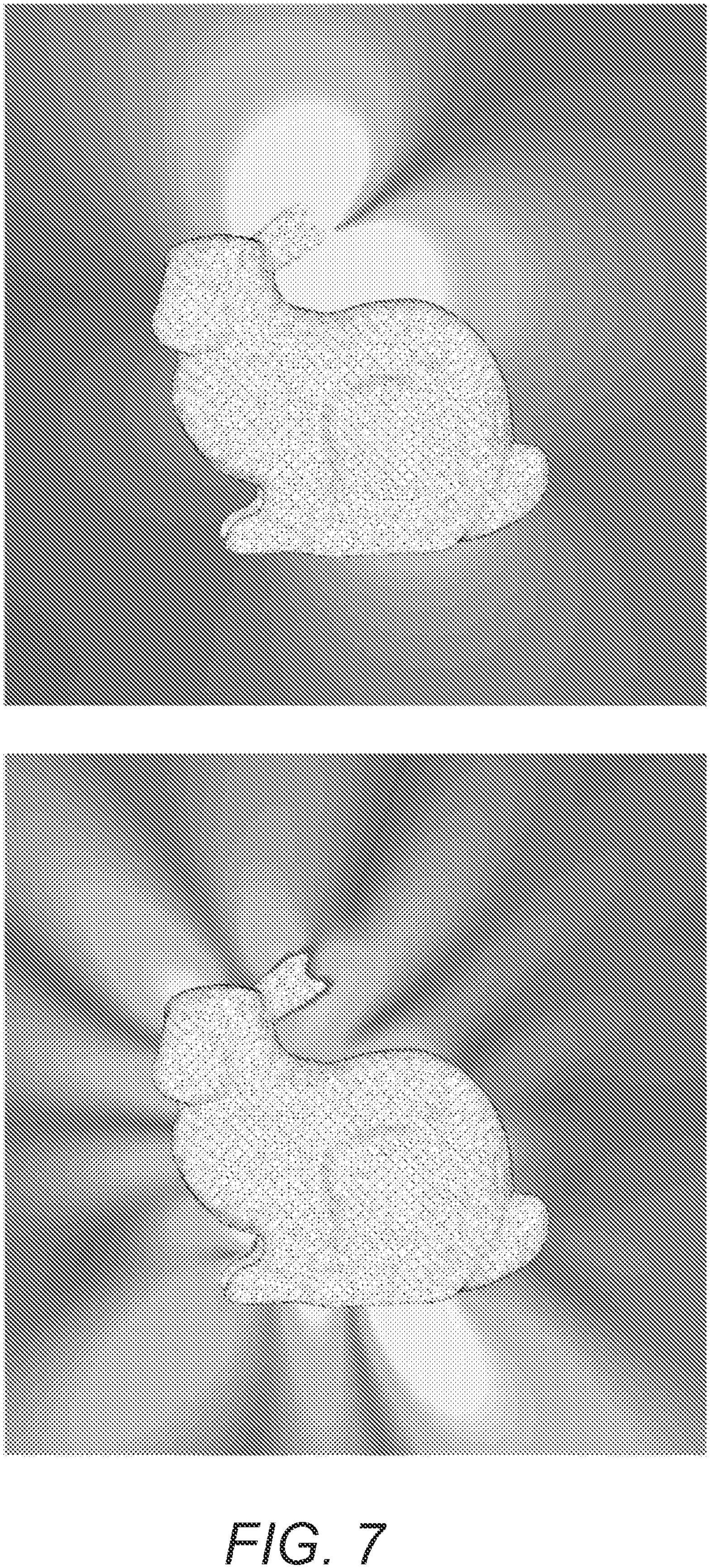
FIG. 7 illustrates two modal sound fields deconflated from a chord sound field in accordance with an embodiment of the invention.
Figure 8:
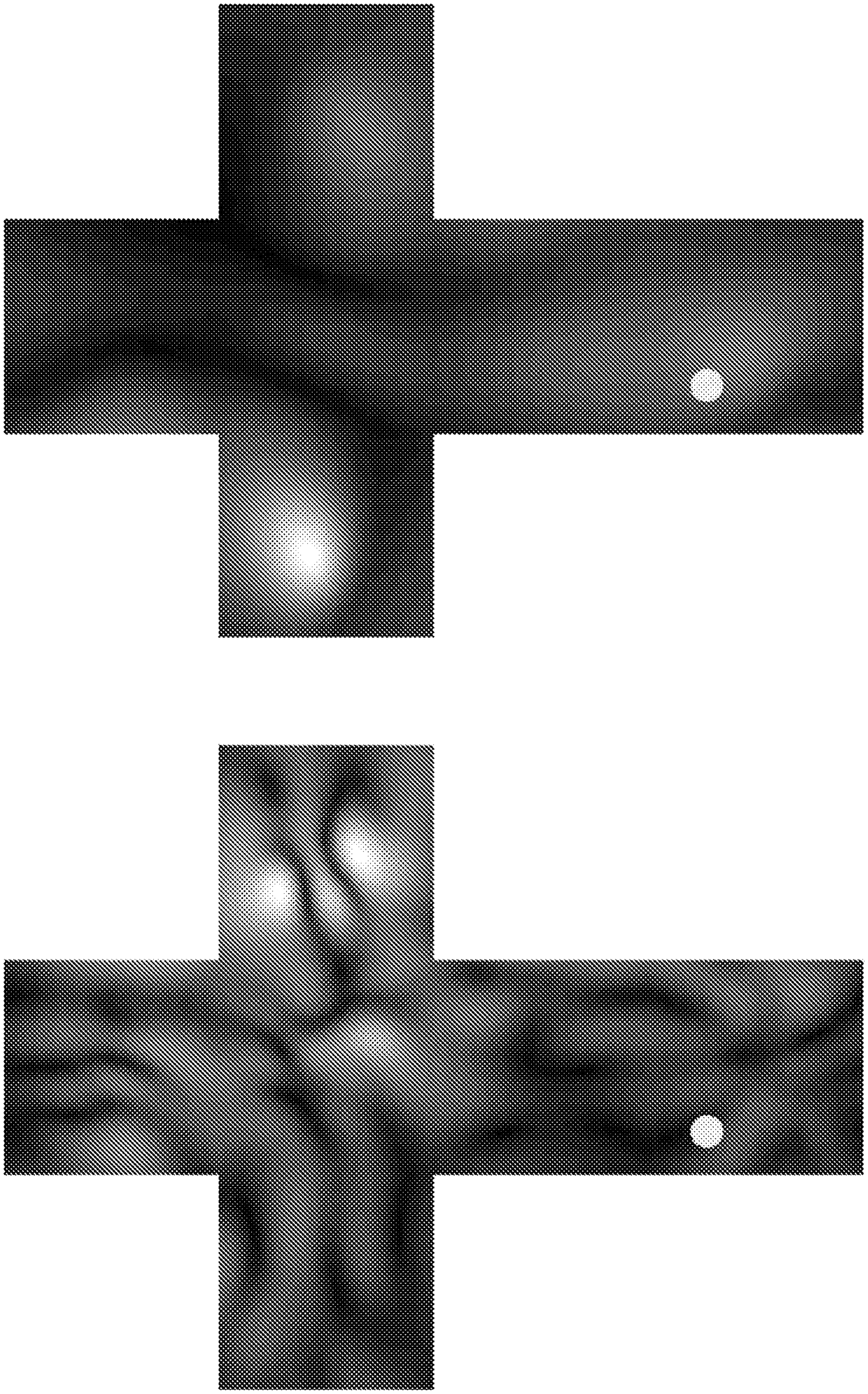
FIG. 8 illustrates two FFAT maps for the two modal sound fields in accordance with an embodiment of the invention.

The set of vibration modes for the object are then conflated (330) by "chord." Each chord consists of a subset of modes that are sufficiently distinct from each other based on a separability constraint. Each chord is then processed to estimate (340) the resulting chord sound field in the time domain. A chord sound field for an arbitrary chord for the object illustrated in FIG. 4 in accordance with an embodiment of the invention is illustrated in FIG. 6. The chord sound field for each chord is then deconflated (350) into a modal sound field solution for each constituent mode. Modal sound fields for individual modes deconflated from the sound field solution of FIG. 6 in accordance with an embodiment of the invention are illustrated in FIG. 7. In many embodiments, the modal sound field information is stored by generating (360) FFAT maps which can be used to easily render sound at runtime. Example FFAT maps for the sound fields in FIG. 7 in accordance with an embodiment of the invention are illustrated in FIG. 8. While FIGS. 4-8 illustrate the outputs of different steps of process 300 with respect to a specific object, it can be readily appreciated that any arbitrary object can be modeled with significantly more modes, chords, and FFAT maps. In order to more fully understand the mathematics involved, the following sections walk through the mathematics and steps used to conflate the vibrational modes, process each chord, deconflate the resulting sound fields, and how to efficiently generate FFAT maps.

A. Base Definitions and Notations

Linear modal analysis is a standard process in engineering and acoustics. Linear modal sound synthesis models describe the displacement of N surface vertices using a linear superposition of m vibrational mode shapes, $\hat{u}_i \in \mathbb{R}^{3N}$, each associated with a vibration frequency $\omega_i = 2\pi f_i$. The surface displacement is given by the matrix-vector multiplication:

$$u(t) = [\hat{u}_1 \hat{u}_2 \ldots \hat{u}_m] q(t) = Uq(t)$$

where $U \in \mathbb{R}^{3N \times m}$ is the surface eigenmode matrix, and $q(t) \in \mathbb{R}^m$ is the vector of modal coordinates $q_i(t) \in \mathbb{R}$. The dynamics of the modal coordinates are governed by m decoupled simple harmonic oscillators:

$$\ddot{q}_i(t) + (\alpha + \beta\omega_i^2)\dot{q}_i(t) + \omega_i^2 q_i(t) = \hat{u}_i \cdot f(t)$$

where (α, β) are Rayleigh damping parameters, and f(t) is a vector of applied surface forces. The oscillator dynamics for q(t) can be time-stepped efficiently using an infinite impulse response (IIR) digital filter in a way suitable for real-time sound synthesis. $\hat{u}_i(x)$ is used to denote the $i^{th}$ mode's surface displacement interpolated at x, and $u_{n,i}(x)=n(x)\cdot\hat{u}_i(x)\in\mathbb{R}$ denotes the normal component of displacement of mode i at x.

Continuing, acoustic transfer functions are another key concept that should be readily understood by one of ordinary skill in the art. Surface vibrations of an object O cause pressure fluctuations in the surrounding air, which radiates outwards as acoustic waves. The acoustic transfer function characterizes this radiation efficiency. More specifically, let Ω be the the air medium containing O, and Γ be the boundary of O. Then the acoustic pressure p caused by the undamped, harmonically vibrating $i^{th}$ mode $\hat{u}_i$ is governed by the acoustic wave equation with the following Neumann boundary condition dependent on the normal surface acceleration $a_{n,i}$:

$$\frac{\partial^2 p(x,t)}{\partial t^2} - c^2\nabla^2 p(x,y) = 0, \qquad x\in\Omega$$

$$\partial_n p(x,t) = -\rho a_{n,i}(x,t) = \rho\omega_i^2 u_{n,i}(x)\cos\omega_i t,\ x\in\Gamma \qquad \text{Equation 4:}$$

where c is the speed of sound in air. The steady-state solution has only harmonic components $$\begin{aligned} p(x,t) &= c_i(x)\cos\omega_i t + d_i(x)\sin\omega_i t, \\ &= \sqrt{c_i^2(x)+d_i^2(x)}\cos(\omega_i t+\varphi_i(x)) \end{aligned}$$

where $(c_i, d_i)$ describes the pressure wave's amplitude $\sqrt{c_i^2+d_i^2}$ and phase $\varphi_i$ at any point x, and are effectively the acoustic transfer function. The following text uses the shorthand notation $p_i(x)=\sqrt{c_i^2(x)+d_i^2(x)}$ for the acoustic amplitude of mode i, when not ambiguous.

Systems and methods described herein further enable runtime sound rendering. The runtime sound at any point x (in O's frame of reference) is approximated by the linear superposition of modal contributions, $$\text{sound}(x,t) = \sum_{i=0}^{m} p_i(x)q_i(t)$$

where $p_i(x)=|\bar{p}_i(x)|$ is mode i's transfer amplitude that is used to scale the $q_i(t)$ modal coordinate. Conventional PAT methods usually precompute fast representations for evaluating $\bar{p}_i(x)$, and then compute its modulus. As described further below, in many embodiments acoustic simulation processes approximate the transfer amplitude directly using nonnegative representations. Building on these basic concepts, the concepts of mode conflation and transfer deconflation are introduced and formalized below.

B. Mode Conflation

Mode conflation is the process by which a set of modes for an object are packed into a single wave solve as a "chord." Consider simulating the first m vibration modes $\omega_i$, i=1 . . . m, at the same time, like playing a chord with m frequencies or notes. By the linearity of the wave equation and acceleration dependence in the Neumann boundary conditions, if the normal surface acceleration $a_n$ is a sum of the m modes' accelerations $$a_n(x,t) = \sum_{i=1}^{m} a_{n,i}(x,t)$$

then the pressure solution is also the sum of m frequency components, $$\begin{aligned} p(x,t) &= \sum_{i=1}^{m} c_i(x)\cos\omega_i t + d_i(x)\sin\omega_i t, \\ &= [\cos\omega_1 t\ \ \sin\omega_1 t\ \ \ldots\ \ \cos\omega_m t\ \ \sin\omega_m t]\begin{pmatrix} c_1(x) \\ d_1(x) \\ \vdots \\ c_m(x)d_m(x) \end{pmatrix} \\ &= \tau(t)^T s(x) \end{aligned}$$

Where $\tau(t)\in\mathbb{R}^{2m}$ is the vector of trigonometric basis functions, and $s(x)\in\mathbb{R}^{2m}$ stacks the unknown transfer coefficients, $(c_i(x), d_i(x))$.

As such, provided that a chord's modal frequencies are distinct, the temporal basis functions, cos $\omega_i$t and sin $\omega_i$t, are all linearly independent functions in time. Therefore, the 2m coefficients $\{(c_i, d_i)\}$, and thus the transfer amplitudes $p_i(x)=\sqrt{c_i^2+d_i^2}$, can be least-squares estimated from simulated temporal samples of $p(x,t)=\tau(t)\cdot s(x)$. This is referred to as "transfer deconflation" and is discussed in further detail in the following section.

However, in many embodiments, it cannot be assumed that there are distinct frequencies for a given object, as many objects have repeated frequencies or very similar frequencies. In fact, (nearly) degenerate frequencies are common, and are often associated with geometric (near) symmetries (e.g. mirror, rotational, cylindrical, etc.). As similar eigenfrequencies lead to similar basis functions that are numerically ill-conditioned, in numerous embodiments, chords used in mode conflation are selected such that they only involve frequencies that satisfy a frequency separation condition. In many embodiments, the frequency separation condition is such that each pair of frequencies $f_i$ and $f_j$ in a chord satisfies $|f_i-f_j|>\varepsilon>0$, where ε is a predetermined gap parameter. The gap parameter can be selected based on the number of modes, the number of frequencies, the number of degenerate frequencies, the minimum distance between frequencies, and/or any other metric as appropriate to the requirements of specific applications of embodiments of the invention, including an arbitrary metric selected by a user to tune computational efficiency versus separation quality.

Optimizing chord construction to facilitate later deconflation is better understood with knowledge of transfer deconflation, and is discussed following the below discussion of transfer deconflation.

C. Transfer Deconflation

Given a temporal signal sampled from a superposition of harmonics with distinct frequencies that are known, it is possible to estimate the amplitude (and phase) of the harmonics using least squares. Transfer deconflation is the process by which this is leveraged to decompose a chord's sound field into the sound fields for each individual mode. Formally, the goal of transfer deconflation is to temporally sample p(x, t)=t(t) s(x) to reconstruct the amplitudes, with two additional concerns: first the amplitudes must be estimated at many positions, x, and second repeated periodically, e.g. after time T in order to monitor amplitude convergence while time stepping the wave equation.

A least-squares method can be used to efficiently compute amplitudes. Consider n pressure samples at x taken at uniformly spaced times, $t_i=t_0+i\delta t$, i=1, . . . , n, where δt is the temporal spacing, and $t_0$ is a waiting period since the timestepping of the wave equation began at t=0. Values for δt and $t_0$ can be arbitrarily selected based on the requirements of particular requirements of an embodiment of the invention. In some embodiments, δt=4Δt, and $t_0$=0, where Δt is the wavesolver's timestep size set to $1/(8f_{max})$. n conditions can be obtained on the coefficients s(x), $$\tau(t_i)^T s(x)=p(x,t_i),\ i=1,\ .\ .\ .\ n.$$

In matrix form, this becomes:

$$\begin{bmatrix} \_\_ & \tau(t_1)^T & \_\_ \\ & \vdots & \\ \_\_ & \tau(t_n)^T & \_\_ \end{bmatrix} s(x) = \begin{pmatrix} p(x, t_1) \\ \vdots \\ p(x, t_n) \end{pmatrix} \Leftrightarrow As = p.$$

This linear least-squares problem As=p has a unique solution if there are enough temporal samples, n≥2m, and it will be well conditioned provided that the frequencies are well separated (the sampling must also have sufficient resolution to avoid aliasing, which is achieved by construction). Only p and s depend on the position x, and not the basis matrix A. Therefore, A's QR factorization can be constructed once at cost $O(nm^2)$, and reuse it to estimate transfer coefficients s at arbitrary many points x. In many embodiments, this can be computationally accelerated by leveraging a GPU, which is discussed in further detail below.

A second aspect of transfer deconflation is efficiently periodically estimating transfer amplitudes. While timestepping the wave equation and sampling pressures at key positions x, a QR solver can be periodically invoked to obtain transfer amplitudes. However, these periodic estimates have different base matrices, A, and therefore require period QR factorizations. This can be mitigated, however, using basis factorization. Consider the trigonometric basis matrix A and one constructed after a period of time T later, named $A_T$. Due to trigonometric properties, these matrices are related by a rotation matrix:

$$A_T = A\begin{bmatrix} B_1 & & & \\ & B_2 & & \\ & & \ddots & \\ & & & B_m \end{bmatrix} \equiv AB$$

where B is a block diagonal and orthogonal, and $B_i \in R^{2\times 2}$ are small rotation matrices $$B_i = \begin{bmatrix} \cos(\omega_i T) & \sin(\omega_i T) \\ -\sin(\omega_i T) & -\cos(\omega_i T) \end{bmatrix}.$$

Therefore, given the thin QR factorization of A=QR, the solution to the new least-squares problem is $$s=(A_T)^{\dagger}p=(AB)^{\dagger}p=B^T A^{\dagger}p$$

where $(\ )^{\dagger}$ denotes the pseudoinverse) which amounts to back-substitution with the original QR factorization, followed by a rotation by the block-diagonal $B^T$ matrix. Therefore, periodic estimates of transfer amplitude can be performed with negligible additional overhead, and only one QR factorization per chord is needed.

The efficient period transfer estimation enables stopping of the simulation whenever a stopping criterion is met, and to keep iterating if the problem is more challenging. In numerous embodiments, this adaptive strategy increases efficiency and the robustness of the deconflation transfer. In many embodiments, the stopping criterion is the relative $\ell^2$-norm of the least square error for As=p above. A solver constructed as illustrated returns the latest transfer field after the error falls below the specified tolerance. In various embodiments, a check for convergence can be made in non-overlapping sliding windows (with hop size T=nδt, with an arbitrary error tolerance appropriate to the scenario (e.g., 1%, although errors may often fall well below this tolerance). With this understanding of mode conflation and transfer deconflation, efficient methods of constructing chords during mode conflation that lead to efficient and accurate transfer deconflation are discussed below.

D. Constructing Chords

Systems and methods described herein attempt to generate K chords that simulate all modes, but avoid closely spaced frequencies, so as to ensure that the trigonometric basis matrix A used in transfer deconflation is well-conditioned. Further, acoustic simulation processes attempt to minimize the number of cords, K, to minimize the number of time-domain wavesolves that need to be calculated. Formally stated, given the frequency distribution $\mathcal{F}$ (in the form of a sorted list)

$$\mathcal{F}\ \{f_i \mid \text{Frequency of the } i^{th} \text{ vibrational mode}\}$$

then $\mathcal{F}$ should be partitioned into a minimal number of K partitions (chords) subject to the frequency separability constraint:

$$\min_{(i,j)\ in\ same\ chord} |f_i - f_j| > \varepsilon$$

for some gap parameter ε. In numerous embodiments, this parameter ε affects the accuracy and performance of the computations. If ε is set too low, the least-squares problem will have a poorly conditioned A matrix, which can lead to inaccurate transfer amplitude estimates. On the other hand, if ε is set too high, the number of chords K needed to partition $\mathcal{F}$ will become large and result in more wavesolves that need to be processed. ε values can be selected using a "time-bandwidth product" discussed further below.

Figure 9:
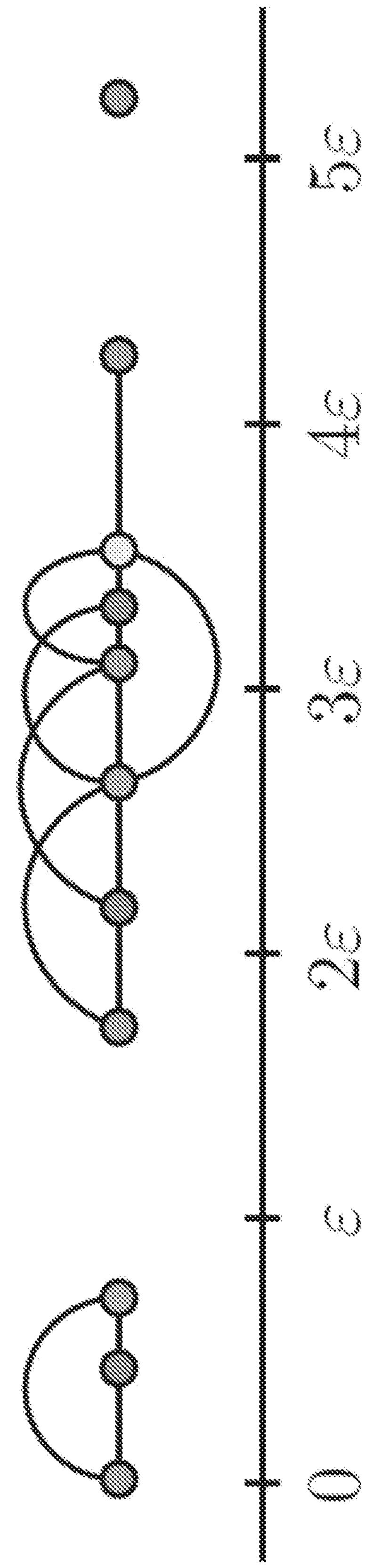
FIG. 9 is an indifference graph for generating chords using a greedy coloring approach in accordance with an embodiment of the invention.

In many embodiments, it is possible to compute an optimal solution to the chord optimization problem (with minimal K chords) using a linear-time algorithm. The chord optimization problem is an instance of a graph coloring problem for a special type of graph called the indifference graph. An indifference graph is an undirected graph where all vertices are assigned a real number (in this case, frequency), and an edge exists whenever two vertices are closer than a unit (the gap parameter, ε). The coloring problem arises since any two vertices connected by an edge cannot be assigned the same color, where here colors represent chords. An instance of an indifference graph in accordance with an embodiment of the invention is illustrated in FIG. 9.

A greedy coloring approach yields an optimal solution for indifference graphs in accordance with the following algorithm:

Initialize colors C={ }

Scan through the vertices using the sorted order of $\mathcal{F}$.

For each vertex v, find $c \in C$ not used by the neighbors of v; otherwise, color v with a new color c', and $C=C \cup \{c'\}$.

The above algorithm can be implemented efficiently in a stack that runs in linear time.

In the context of the overall processing pipeline, three parameters in mode conflation have significant impact on transfer deconflation: (n, $\delta t$, $\varepsilon$). Their effects on deconflation performance can be characterized using a single non-dimensional "time-bandwidth product" (TBP), defined as:

$$TBP = n\,\delta t\,\varepsilon = \frac{T_{window}}{T_{beat}}$$

where $T_{window} \equiv n\delta t$ is the length of the sliding window, and $T_{beat} \equiv 1/\varepsilon$ is the inverse of the beat frequency caused by the two closest modal frequencies. The TBP directly affects the stability of the least-square basis matrix A defined above. In numerous embodiments, a basis with a high TBP has better conditioning and the resulting solves are more stable, whereas one with a low TBP (especially when lower than 1) can cause conditioning problems. In many embodiments, a TBP of 1 is sufficient for many challenging problems, and an increase in TBP is indicative of additional computational cost.

Using the above, a set of K chords can be generated from any arbitrary number of modes m in such a way as to lead to easy deconflation. As noted above, between the mode conflation and transfer deconflation steps, chord sound fields are generated. In contrast to traditional methods which operate in the frequency domain to solve for the sound field, chords are solved in the time-domain. Vector wavesolvers which can estimate chord sound fields are described below.

E. Estimating Sound Fields Using Vector Wavesolvers

To solve the bottleneck of estimating the sound field of each mode individually, systems and methods described herein instead perform K separate time-domain wavesolves, each with the conflated boundary condition (BC) of $a_n(x, t)$ defined above. Time-domain solving of the Helmholtz equation is not typically performed as if one were to need to determine the sound field for a single mode, it is more computationally intensive than by merely performing a frequency-domain wave solve. However, as discussed above, by conflating modes and solving the chord in the time-domain, significant speed increases can be achieved. A second advantage of the time-domain wave solve is that it can be highly parallelized. Wavesolvers in accordance with embodiments of the invention are described below with particular respect to their operation on a GPU in order to leverage their parallel computing capacity, however as can be readily appreciated, similar implementations can be achieved using CPUs, distributed systems, and/or other logic circuits.

In numerous embodiments, depending on the object, close frequencies can occur in the high-frequency range, resulting in several chords having similar highest frequencies, and thus similar step rates. To leverage this, in many embodiments, solves for chords with similar step rates can be run together using the same (min) step size and spatial discretization. This is mathematically equivalent to solving the discreet vector wave equation with BCs, $$\frac{\partial^2 p(x, t)}{\partial t^2} - c^2\nabla^2 p(x, t) = 0$$

-continued $$\partial_n p(x, t) = -\rho a_n(x, t).$$

With specific respect to a GPU implementation, solving the vector wave equation has several practical advantages over the scalar one: (1) it can enable reuse of potentially expensive geometry rasterization and other overhead, such as (but not limited to) cell index calculation, across vector components; (2) it can increases per-thread compute density; (3) it can educes kernel launch overhead; and (4) it often results in better caching behavior for fetching modal matrix, which can be sparse for a small chord. To attain a more optimized load balance, a modified SortedBalance algorithm used for makespan minimization problems can be used. The instant problem is a makespan problem because each machine can be considered an instance of wavesolve, each job a chord with conflated modes, and jobs assigned to the same machine can be vectorized.

Chords can be sorted based on the number of modes conflated, which is the measure of compute load, e.g., it accounts for the higher cost of the dense matrix-vector multiply Uq when computing the acceleration BC for larger chords. The list is then looped through in order, and a job is assigned to the lightest machine if the new processing time does not exceed that maximum process time of any machine at the time, or the hardware resources. Otherwise, the job is assigned to a new machine. A formalized pseudocode version of modified SortedBalance in accordance with an embodiment of the invention is illustrated in FIG. 10. In many embodiments, each sound field to be processed can be put into one of an R, G, B, and alpha component of a GPU-ready data structure to further pack data more efficiently. However, any number of approaches for packing each sound field into a component of a vector for a vectorized wavesolve, not just methods that utilize an RGBA vector, can be used as appropriate to the requirements of specific applications of embodiments of the invention.

Acceleration is not restricted only to load balancing. In many embodiments, a hybrid discretization approach can further be applied for improved perfectly matched layers (PML). In many embodiments, a hybrid wavesolvers are based on a finite-difference time-domain (FDTD) discretization scheme with an absorbing boundary layer optimized for GPU programming and for the transfer computation with a fixed object. In many embodiments, a voxelized boundary discretization in conjunction with controlling the staircasing boundary error by sampling finer than the Shannon-Nyquist bound can yield additional efficiency by reducing memory traffic while keeping threads busy.

Hybrid wavesolvers can ensure fast wave simulation for the majority of cells, and accurate grid-boundary absorption using PML in order to minimize artifacts caused by spurious wave reflections that might corrupt transfer deconflation. The inner domain, which contains the object, can utilize a pressure-only collocated grid with a lightweight 7-point stencil, where the outer domain can use a pressure-velocity staggered grid to support accurate split-field PML. Split-field PML gives better absorption than purely scalar pressure-only absorption model because it damps waves in different directions separately. In this way, the inner and outer domains can be combined seamlessly and time-stepped separately.

Finally, to further accelerate wavesolving, a compact object bitset representation can be used. In many embodiments, during solver initialization, the object is conservatively rasterized to the grid using a standard approach.

However, the rasterized representation may be needed by various kernels to sample boundary conditions at every time step. Therefore, it can be beneficial in many embodiments to use a compressed representation to reduce memory traffic.

Figure 11A:
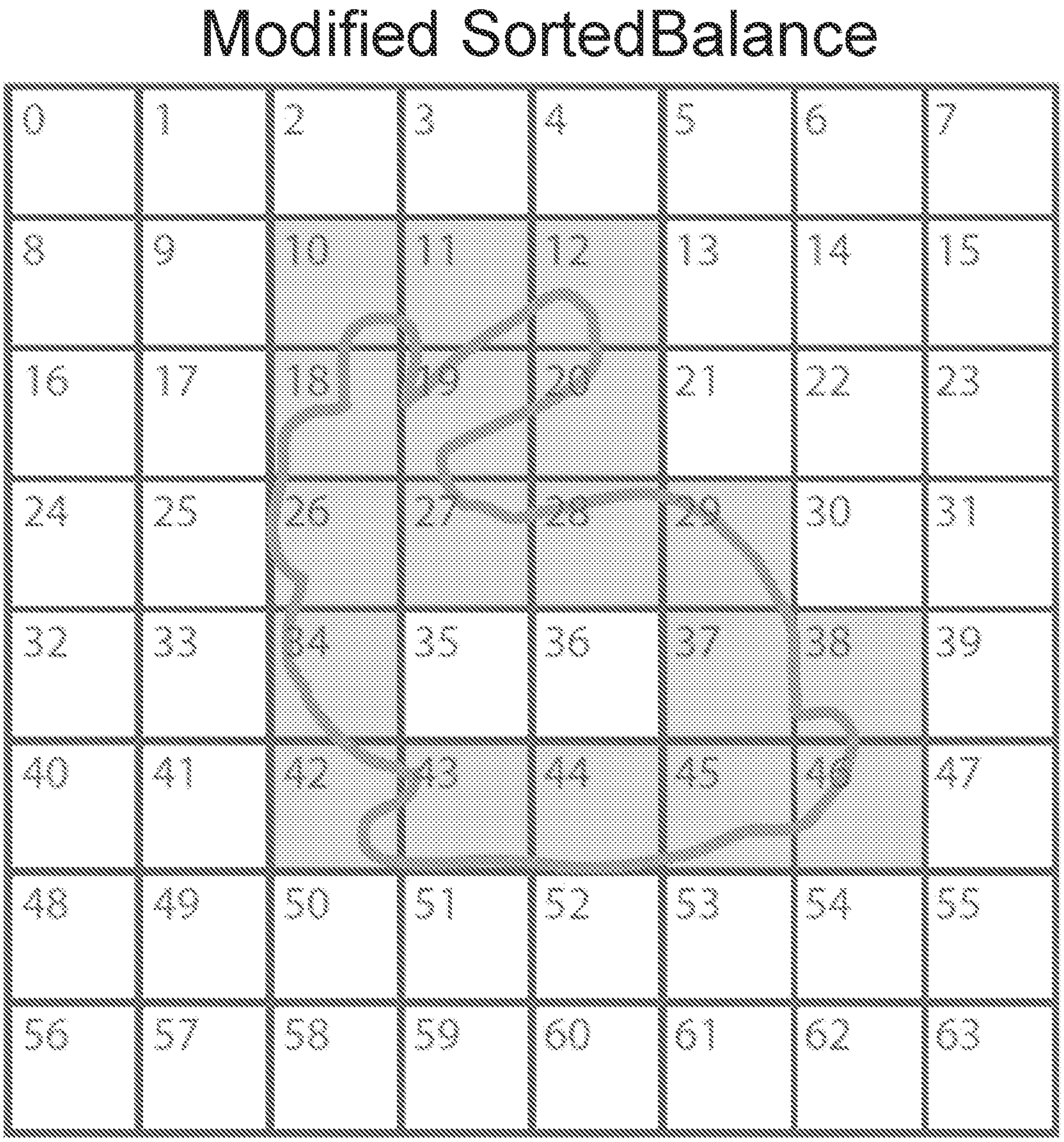
FIGS. 11A and 11B represent a rasterized object and a compact bitset representation of the rasterized object, respectively, in accordance with an embodiment of the invention.
Figure 11B:
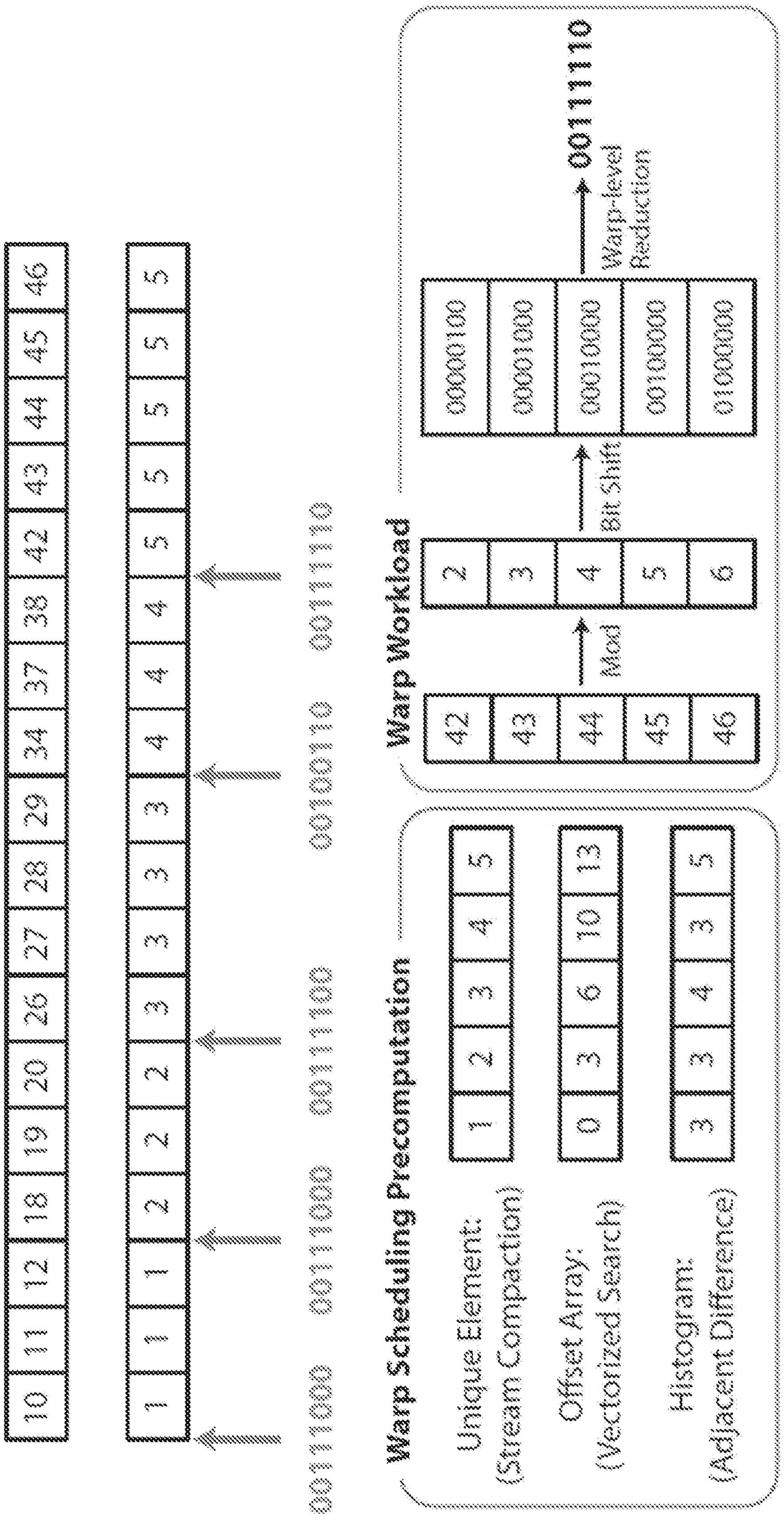

In numerous embodiments, a multi-pass algorithm compresses the rasterized representation into a bitset representation. Consider a list of size $|\mathcal{L}|$ of cell indices indicating rasterized cells. The goal is to compute a binary packing to $\lceil |\mathcal{L}|/\ell \rceil$ strings, each of $\ell$-bit length. First, a series of passes are run over $\mathcal{L}$ to determine the offset of each string. The passes consist of stream compaction, vectorized search, and adjacent differences. An optimal schedule can be generated, and each thread execution group can process the binary representation independently. To demonstrate this concept, a rasterized object in accordance with an embodiment of the invention is illustrated in FIG. 11A, and the compact bitset representation of the rasterized object in accordance with an embodiment of the invention is Illustrated in FIG. 11B. Note in this context, "warp" is synonymous with "thread group."

Using any or all of these approaches: vector wave equation-based load balancing, hybrid discretization, and bitset representation, can yield additional accelerations, especially when operating on a GPU. However, as can be readily appreciated, even conventional time-domain wave solvers can be used on chords and still yield chord sound fields which can be transfer deconflated. It is not a requirement of any acoustic simulation system to utilize these acceleration steps. With this understanding of how to quickly determine the sound fields for all of an object's modes, methods for storing the sound fields for each mode are explored below.

F. Far-Field Acoustic Transfer (FFAT) Maps

In many embodiments, acoustic transfer functions discussed above are computed in a small domain containing the object. However, in many situations, sound will need to be rendered outside of this small domain. For example, if a player's avatar in a VR game picks up a rock and throws it at a bowl far away from the position of the avatar, it is unlikely that the "ears" of the avatar are located within the domain of the computed acoustic transfer function of the bowl. As such, a practical way to extend these solutions into the acoustic far field is desirable for many applications. FFAT maps are conventionally designed to approximate $\bar{p}(x) \in \mathbb{C}$. In many embodiments, a modified FFAT map ignores phase values and instead directly approximates the simpler squared transfer amplitude $p^2(x)=|\bar{p}(x)|^2$, using a real-valued expansion. Specifically, in a variety of embodiments, $p^2$ is approximated using a positive polynomial 1/r with direction dependent coefficients $$T(r) \equiv \left(\sum_{i=1}^{\tilde{M}} \frac{\psi_i(\hat{r})}{r^i}\right)^2 \approx p^2(r),$$

where the radial expansion is evaluated with respect to the object's bounding box center point, $x_0$. The functions $\psi_i$, capture the directionality of the radiating fields, and the radial expansion has the correct asymptotic behavior as $r \rightarrow \infty$.

Figure 12:
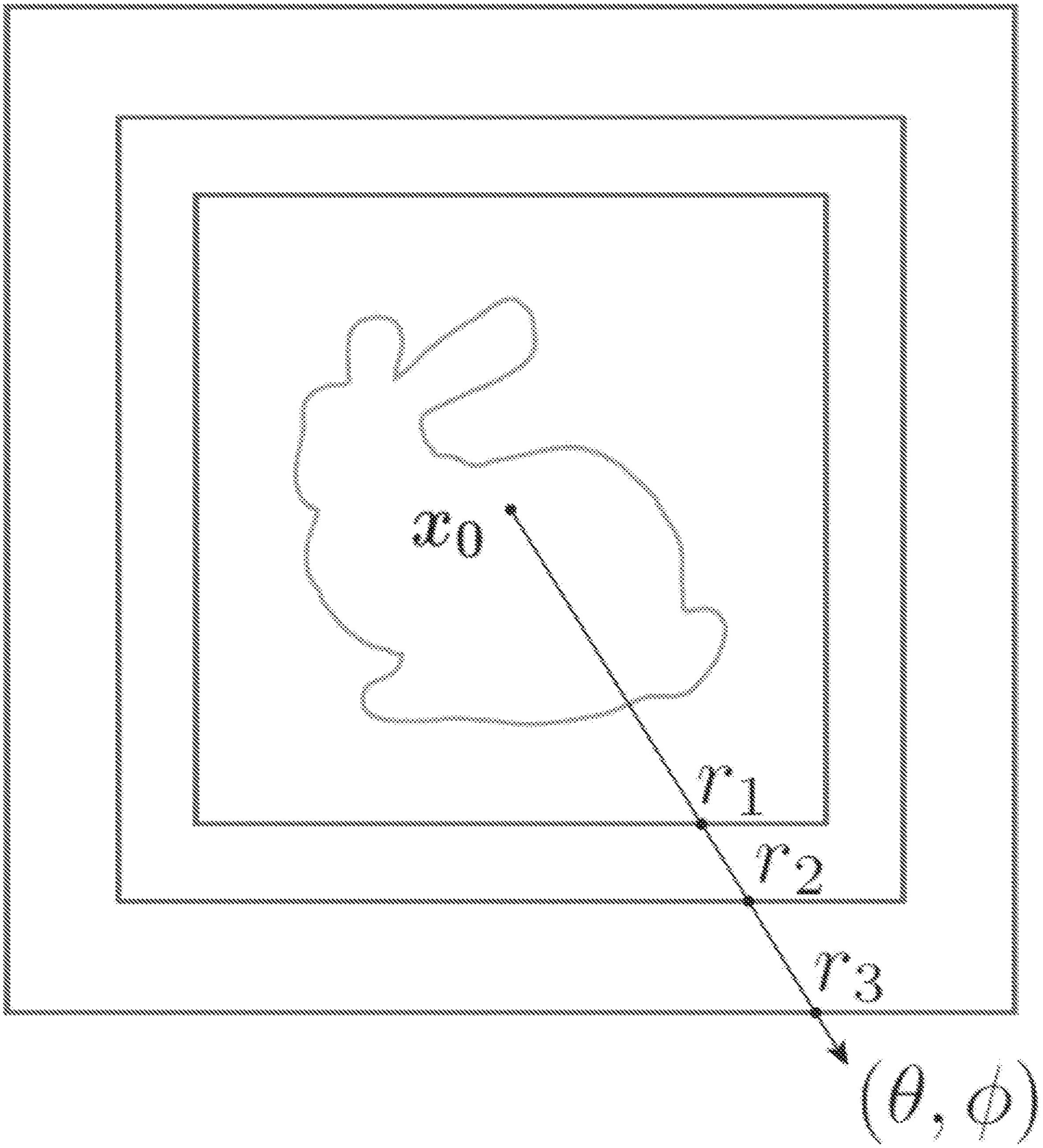
FIG. 12 illustrates a process for estimating $\psi_i$ in accordance with an embodiment of the invention.

The coefficient $\psi_i$ for a given angular direction is estimated using least-squares by taking $\tilde{N}$ samples at the intersection points between an emitted ray from $x_0$, and concentric boxes that aligned with the solver grid. To illustrate this concept, a series of concentric boxes around an object in accordance with an embodiment of the invention are illustrated in FIG. 12. The boxes are geometrically expanded from the bounding box of the object: e.g. $R_i=1.25^i$ for the expansion ratio of the $i^{th}$ box. While any number of different values for $R_i$, $\tilde{M}$, and $\tilde{N}$ can be selected, in many embodiments, $\tilde{M}=1$, and $\tilde{N}=3$ yield robust results while remaining computationally efficient as the least-square solve per ray only involves two 3-vector dot products and a division. As can be readily appreciated, these values can be modified as desired based on the object and computational power available. The directional parametrization of $\psi_i$ can be chosen to coincide with the largest box mesh, in order to reduce resampling issues. Pressure values on the other two boxes can be bilinearly interpolated to the appropriate sample locations. Because of the chosen box parametrization, the resulting $\psi_i$ field can be efficiently processed, compressed, stored, and looked up using standard image processing libraries.

As can be readily appreciated from the above, FFAT maps can be used not only to store the calculated modal sound fields, but to precompute acoustic responses at arbitrary distances outside of the calculated modal sound field. Further, FFAT maps are relatively small, and can be stored in association with an object in order to quickly synthesize any acoustic response needed by a simulation. Processes for using FFAT maps to render audio in digital environments are discussed in further detail below.

G. Audio Synthesis using FFAT Maps

Systems and methods described above are capable of quickly computing acoustic transfer for a given object, and storing the results for each mode in FFAT maps. FFAT maps, including the specialized FFAT maps described above, can be used to render audio at runtime in, for example, a video game, a VR experience, or any other digital experience. By storing FFAT maps as metadata or otherwise in association with an object, they can be rapidly accessed based on the vibrational modes triggered when an object in the simulation is interacted with to determine the appropriate acoustic output for the user based on their relative position to the object.

Figure 13:
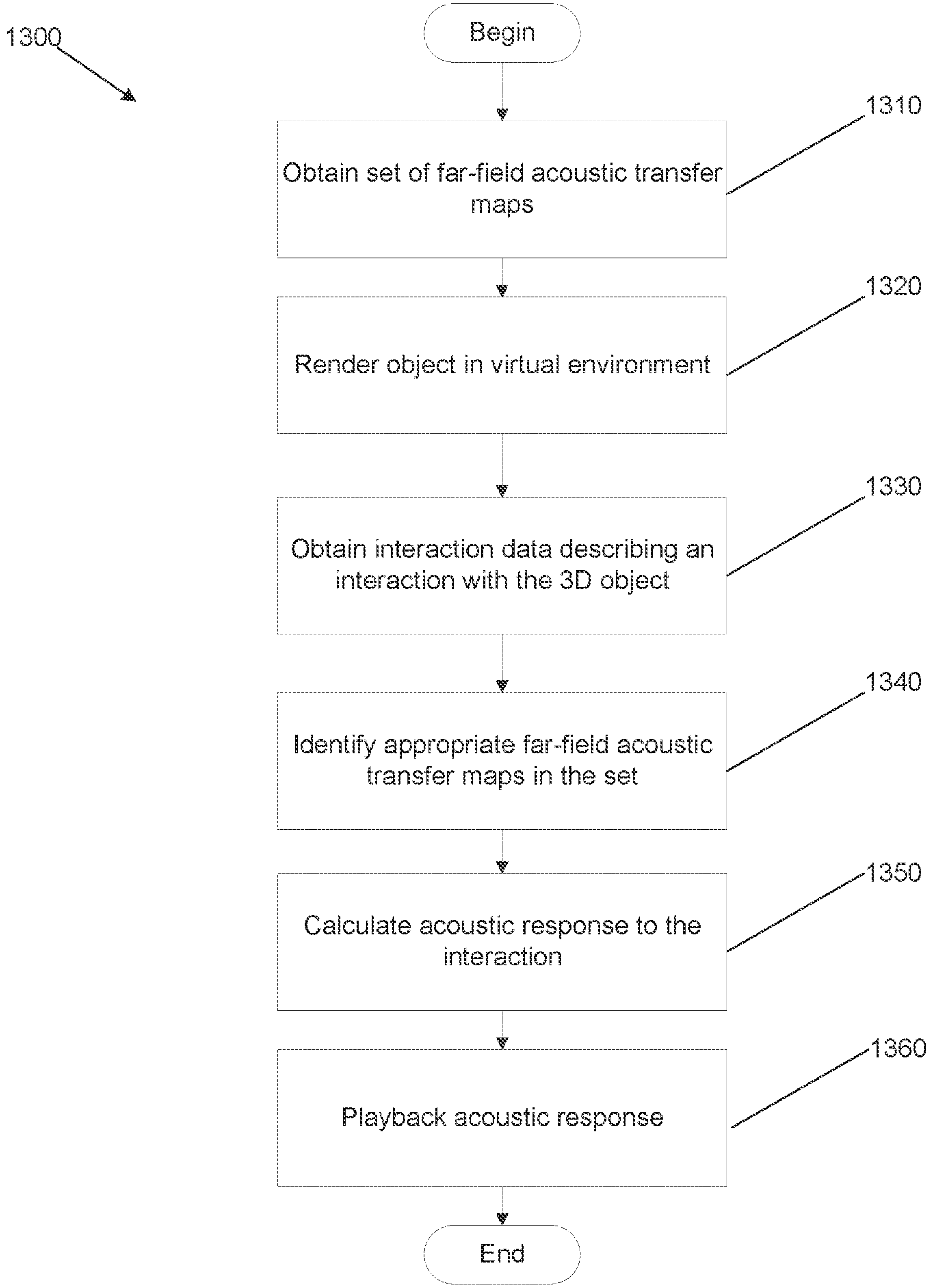
FIG. 13 is a flow chart for a process for playing back the acoustic response of an object in accordance with an embodiment of the invention.

Turning now to FIG. 13, a process for playing back the acoustic response of an object in a simulation in accordance with an embodiment of the invention is illustrated. Process 1300 includes obtaining (1310) a set of FFAT maps for a given object. As previously noted, FFAT maps can be stored as metadata to object data, and/or otherwise be associated with the rendered model of the object. The object is rendered (1320) in a virtual environment. When an interaction occurs with the object (e.g. it is manipulated in some way that would trigger an acoustic response), interaction data describing the interaction is obtained (1330). In many embodiments, the interaction data contains a vector describing a force applied at a particular point to the object. However, interaction data can describe the interaction using any number of different data structures which can be used to determine which vibrational modes are triggered by the interaction. The appropriate FFAT maps describing the triggered vibrational modes are identified (1340) and used to calculate (1350) the acoustic response to the interaction appropriate to the listener's position with respect to the object. In many embodiments, the pressure response at the listeners location for each triggered mode are summed to produce the appropriate output signal (an "acoustic response signal"). In various embodiments, multiple pressure responses (and multiple output signals) are generated if there are multiple listeners, and/or if multiple output channels are desired (e.g. for binaural output, surround sound speaker layouts, etc.). In various embodiments, the summation is formalized as, $$\sum_{i=1}^{m} |p_i(x)| q_i(t).$$

The output signal can then be played back (1360) via an appropriate loudspeaker and/or audio system as appropriate to the requirements of specific applications of embodiments of the invention.

While many systems and methods for acoustic simulation are discussed above, many different system architectures and methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for simulating acoustic responses, comprising:

obtaining a digital model of an object;

calculating a plurality of vibrational modes of the object;

conflating the plurality of vibrational modes into a plurality of chords, where each chord comprises a subset of the plurality of vibrational modes;

calculating, for each chord, a chord sound field in the time domain, where the chord sound field describes acoustic pressure surrounding the object when the object oscillates in accordance with the subset of the plurality of vibrational modes;

deconflating each chord sound field into a plurality of modal sound fields, where each modal sound field describes acoustic pressure surrounding the object when the object oscillates in accordance with a single vibrational mode;

storing each modal sound field in a far-field acoustic transfer (FFAT) map, wherein the FFAT map approximates a squared transfer amplitude at a plurality of coordinates; and simulating an acoustic response of the object using the FFAT map.

2. The method of claim 1, further comprising:

rendering the digital model of the object in a digital environment;

receiving interaction data, where the interaction data describes an interaction between the rendered digital model and a second object in the digital environment; and playing back an acoustic response based on vibrations of the digital model of the object in response to the described interaction.

3. The method of claim 2, wherein playing back the acoustic response comprises:

selecting at least one FFAT map based on the vibrations of the digital model;

determining a location of a listener in the virtual environment with respect to the digital model;

summing amplitudes for each frequency generated by the object at the location of the listener based on the FFAT maps.

4. The method of claim 2, wherein the second object in the digital environment is an avatar.

5. The method of claim 2, wherein the second object in the digital environment is a cursor.

6. The method of claim 1, wherein the FFAT map is stored as metadata to the digital object.

7. The method of claim 1, wherein calculating the chord sound field comprises solving the Helmholtz wave equation in the time domain.

8. The method of claim 1, wherein conflating the plurality of vibrational modes comprises utilizing a greedy algorithm to identify the subset of the plurality of chords separated by a gap parameter.

9. The method of claim 1, wherein a approximating squared transfer amplitude at a plurality of coordinates comprises using a positive polynomial 1/r with direction dependent coefficients where a radial expansion is evaluated with respect to a center point of a bounding box of the object, functions $\psi_i$, capture the directionality of the radiating fields, and the radial expansion has the correct asymptotic behavior as $r \rightarrow \infty$.

10. An acoustic simulator, comprising:

a processor;

a graphics processing unit (GPU); and a memory, the memory containing an acoustic modeling application;

where the acoustic modeling application directs the processor to:

obtain a digital model of an object;

calculate a plurality of vibrational modes of the object;

conflate the plurality of vibrational modes into a plurality of chords, where each chord comprises a subset of the plurality of vibrational modes;

calculate, for each chord, a chord sound field in the time domain, where the chord sound field describes acoustic pressure surrounding the object when the object oscillates in accordance with the subset of the plurality of vibrational modes using the GPU;

deconflate each chord sound field into a plurality of modal sound fields, where each modal sound field describes acoustic pressure surrounding the object when the object oscillates in accordance with a single vibrational mode;

store each modal sound field in a far-field acoustic transfer (FFAT) map, wherein—the FFAT map approximates a squared transfer amplitude at a plurality of coordinates;

receive an interaction with the digital interaction of the object; and simulate an acoustic response of the object using the FFAT map.

11. The acoustic simulator of claim 10, wherein the acoustic modeling application further directs the processor to:

render the digital model of the object in a digital environment;

receive interaction data, where the interaction data describes an interaction between the rendered digital model and a second object in the digital environment; and play back an acoustic response based on vibrations of the digital model of the object in response to the described interaction.

12. The acoustic simulator of claim 11, wherein to play back the acoustic response, the acoustic modeling application further directs the processor to:

select at least one FFAT map based on the vibrations of the digital model;

determine a location of a listener in the virtual environment with respect to the digital model;

sum amplitudes for each frequency generated by the object at the location of the listener based on the FFAT maps.

13. The acoustic simulator of claim 11, wherein the second object in the digital environment is an avatar.

14. The acoustic simulator of claim 11, wherein the second object in the digital environment is a cursor.

15. The acoustic simulator of claim 10, wherein the FFAT map is stored as metadata to the digital object.

16. The acoustic simulator of claim 10, wherein to calculate the chord sound field, the acoustic modeling application further directs the GPU to solve the Helmholtz wave equation in the time domain.

17. The acoustic simulator of claim 10, wherein to conflate the plurality of vibrational modes, the acoustic modeling application further directs the processor to utilize a greedy algorithm to identify the subset of the plurality of chords separated by a gap parameter.

18. The acoustic simulator of claim 10, wherein to approximate the squared transfer amplitude at a plurality of coordinates, the acoustic modeling application further directs the processor to apply a positive polynomial 1/r with direction dependent coefficients where a radial expansion is evaluated with respect to a center point of a bounding box of the object, functions wi, capture the directionality of the radiating fields, and the radial expansion has the correct asymptotic behavior as $r \rightarrow \infty$.

* * * * *